United States Patent
Sasaki et al.

(10) Patent No.: US 11,673,999 B2
(45) Date of Patent: Jun. 13, 2023

(54) POLYIMIDE PRECURSOR SOLUTION AND METHOD FOR PRODUCING POROUS POLYIMIDE FILM

(71) Applicant: FUJIFILM BUSINESS INNOVATION CORP., Tokyo (JP)

(72) Inventors: Tomoya Sasaki, Kanagawa (JP); Hidekazu Hirose, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 373 days.

(21) Appl. No.: 16/995,146

(22) Filed: Aug. 17, 2020

(65) Prior Publication Data
US 2021/0230367 A1     Jul. 29, 2021

(30) Foreign Application Priority Data
Jan. 28, 2020   (JP) ............... JP2020-011366

(51) Int. Cl.
| | |
|---|---|
| *C08G 73/10* | (2006.01) |
| *C08L 25/14* | (2006.01) |
| *C08K 5/41* | (2006.01) |
| *C08K 5/053* | (2006.01) |
| *C08K 7/16* | (2006.01) |

(52) U.S. Cl.
CPC .......... *C08G 73/1007* (2013.01); *C08K 5/053* (2013.01); *C08K 5/41* (2013.01); *C08K 7/16* (2013.01); *C08L 25/14* (2013.01); *C08L 2203/16* (2013.01)

(58) Field of Classification Search
None
See application file for complete search history.

(56) References Cited

U.S. PATENT DOCUMENTS 10,096,809 B2    10/2018    Kanamura et al.

FOREIGN PATENT DOCUMENTS

| EP | 0532953 | * | 3/1998 |
|---|---|---|---|
| JP | 2018-097915 A | | 6/2018 |
| JP | 6358663 B2 | | 7/2018 |
| JP | 6404028 B2 | | 10/2018 |
| WO | WO 2007/140477 A2 | * | 12/2007 |

OTHER PUBLICATIONS 10 page brochure for ethylene glycol by Sigmaaldrich, Downloded on Oct. 20, 2022.*

* cited by examiner

*Primary Examiner* — Tae H Yoon
(74) *Attorney, Agent, or Firm* — Oliff PLC

(57) ABSTRACT

A polyimide precursor solution includes: a polyimide precursor; a resin particle having 55% by weight or more of a structural unit derived from a styrene derivative; and a mixed solvent containing a first organic solvent (S1) and a second organic solvent (S2), wherein the polyimide precursor solution satisfies the following conditions (1) to (4), condition (1): a weight ratio (S1/S2) of the first organic solvent (S1) to the second organic solvent (S2) is from 50/50 to 90/10,
condition (2): a HSP distance between the first organic solvent (S1) and the resin particle is 11 or more and less than 16,
condition (3): a HSP distance between the second organic solvent (S2) and the resin particle is 16 or more, and
condition (4): a HSP distance between the mixed solvent and the polyimide precursor is 12 or less.

19 Claims, 1 Drawing Sheet

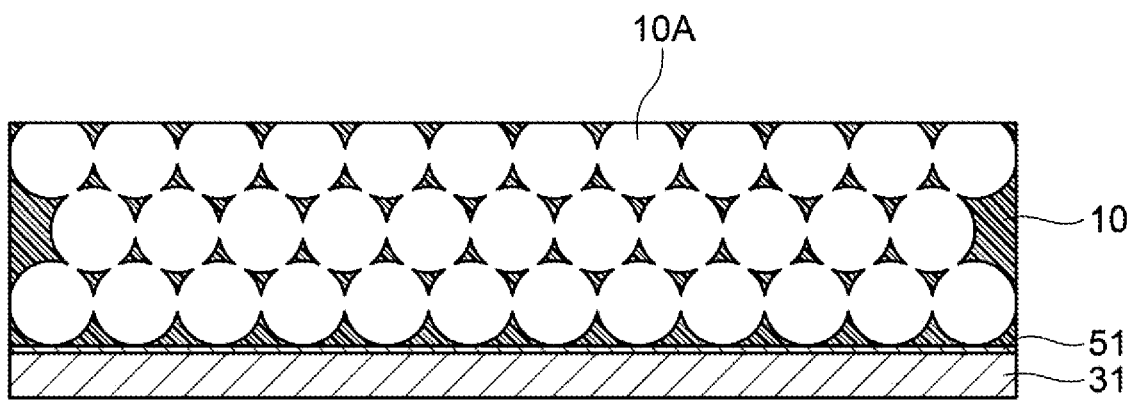

POLYIMIDE PRECURSOR SOLUTION AND METHOD FOR PRODUCING POROUS POLYIMIDE FILM

CROSS-REFERENCE TO RELATED APPLICATIONS

This application is based on and claims priority under 35 USC 119 from Japanese Patent Application No. 2020-011366 filed Jan. 28, 2020.

BACKGROUND

(i) Technical Field

The present invention relates to a polyimide precursor solution and a method for producing a porous polyimide film.

(ii) Related Art

JP-A-2018-097915 discloses "a method for producing a polyimide separator, the method including: preparing slurry by mixing a polymer particle that is capable of being thermally decomposed in a temperature range of from higher than 370° C. to a decomposition temperature of polyimide and has a glass transition temperature lower than a glass transition temperature of the polyimide with a mixture of polyamic acid which is included in N,N-dimethylacetamide; ethylene glycol; and a nonionic surfactant; forming a film with the slurry; and heat-treating the film at a temperature of from higher than 370° C. to a decomposition temperature of the polyimide under an inert gas atmosphere having an oxygen concentration of 10 vol % or lower such that the polyamic acid is converted into polyimide by a thermal imidization reaction, removing the polymer particles by thermal decomposition, and to form a three-dimensional regular array macropore in which plural macropores each having a uniform shape and size are regularly arranged in a three-dimensional direction, thus obtaining a polyimide separator having the three-dimensional regular array macropore".

JP-B-6404028 discloses "a method for producing a porous polyimide film including a film formation step for an unbaked composite film in which a varnish containing polyamic acid or polyimide, fine particles, and a solvent is applied on a substrate and then dried to form a film; a release step of releasing the unbaked composite film from the substrate; a baking step of baking the unbaked composite film after the release step to obtain a polyimide-fine particle composite film; and a fine particle removing step for removing the fine particles from the polyimide-fine particle composite film; without a step of providing a releasing layer on the substrate in advance before the varnish is applied on the substrate in the film formation step, in which the solvent is a mixed solvent (S) containing a high boiling point solvent (S1) having a boiling point at an atmospheric pressure of 190° C. or higher, and the high boiling point solvent (S1) contains a lactone polar solvent".

JP-B-6358663 discloses "a method for producing a secondary battery separator including a porous resin film in which pores have a three-dimensional stereoscopic regular array structure and the pores are communicated with each other by communication pores, the method including: narrowly dispersed spherical fine particle surface passivation step for passivating a surface of narrowly dispersed spherical fine particles with respect to a dispersion medium; a narrowly dispersed spherical fine particle dispersion slurry preparation step for dispersing the narrowly dispersed spherical fine particles in the dispersion medium uniformly to prepare fine particle dispersed slurry; a narrowly dispersed spherical fine particle dispersed film preparation step for drying the fine particle dispersed slurry to obtain narrowly dispersed spherical fine particle dispersed film; a fine particle-resin film formation step for heat-treating the film to form a fine particle-resin film in which the fine particles are three-dimensionally stereoscopically regularly arrayed in a resin matrix; and a porous resin film formation step for forming pores that are communicated with each other by communication pores to have a three-dimensional stereoscopic regular array structure in the resin matrix, by removing the fine particles in a dissolving manner by bringing the fine particle-resin film into contact with an inorganic acid other than hydrofluoric acid, an organic acid, water, or an alkaline solution or removing the fine particles by heating the fine particle-resin film, in which the dispersion medium contains a precursor of a resin forming the resin matrix, the surface of the narrowly dispersed spherical fine particles is passivated with respect to the dispersion medium, the resin matrix is polyimide, and the precursor of the resin is polyamic acid.".

SUMMARY

Aspects of non-limiting embodiments of the present disclosure relate to a polyimide precursor solution including: a polyimide precursor; a resin particle having 55% by weight or more of a structural unit derived from a styrene derivative; and a mixed solvent containing a first organic solvent (S1) and a second organic solvent (S2), with the resin particle being prevented from swelling or dissolving even when the polyimide precursor solution is stored for a long time, as compared with a case where the solution does not satisfy at least one of conditions (1) to (4) described below.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a polyimide precursor solution including:

a polyimide precursor;

a resin particle having 55% by weight or more of a structural unit derived from a styrene derivative; and a mixed solvent containing a first organic solvent (S1) and a second organic solvent (S2), wherein the polyimide precursor solution satisfies the following conditions (1) to (4), condition (1): a weight ratio (S1/S2) of the first organic solvent (S1) to the second organic solvent (S2) is from 50/50 to 90/10, condition (2): a HSP distance between the first organic solvent (S1) and the resin particle is 11 or more and less than 16, condition (3): a HSP distance between the second organic solvent (S2) and the resin particle is 16 or more, and condition (4): a HSP distance between the mixed solvent and the polyimide precursor is 12 or less.

BRIEF DESCRIPTION OF THE DRAWINGS

FIG. 1 is a schematic view showing an example of a form of a porous polyimide film according to the present exemplary embodiment.

DETAILED DESCRIPTION

Hereinafter, an exemplary embodiment of the present invention will be described.

These descriptions and examples illustrate the exemplary embodiments, and do not limit the scope of the exemplary embodiments.

In the numerical ranges described in stages in the present specification, an upper limit or a lower limit described in one numerical range may be replaced with an upper limit or a lower limit of a numerical range described in other stages. Also, in the numerical ranges described in the present specification, an upper limit or a lower limit of the numerical ranges may be replaced with a value shown in examples.

In the present specification, the term "step" includes not only an independent step but also a case where a step cannot be distinguished from other steps clearly as long as an intended purpose of the step is achieved.

Each component may include plural corresponding substances.

In a case where plural substances corresponding to the component are present in the composition, unless otherwise specified, the amount of the component in the composition means the total amount of the plural substances present in the composition.

In the present exemplary embodiment, the term "film" has a concept including not only what is generally called "coat" but also what is generally called "film" or "sheet".

<Polyimide Precursor Solution>

A polyimide precursor solution according to the present exemplary embodiment contains a polyimide precursor, a resin particle having 55% by weight or more of a structural unit derived from a styrene derivative, and a mixed solvent containing a first organic solvent (S1) and a second organic solvent (S2), and satisfies the following conditions (1) to (4).

Condition (1): A weight ratio (S1/S2) of the first organic solvent (S1) to the second organic solvent (S2) is from 50/50 to 90/10.

Condition (2): A HSP distance between the first organic solvent (S1) and the resin particle is 11 or more and less than 16.

Condition (3): A HSP distance between the second organic solvent (S2) and the resin particle is 16 or more.

Condition (4): A HSP distance between the mixed solvent and the polyimide precursor is 12 or less.

Here, the HSP is a Hansen solubility parameter. The HSP is a value obtained by quantifying a solubility of a certain substance (X) in another substance (Z) using a multidimensional vector. It is shown that the shorter the distance between vectors of the X and the Z, that is, the shorter the HSP distance, the easier the dissolution (the higher the compatibility).

According to the polyimide precursor solution of the exemplary embodiment, a polyimide precursor solution in which even when stored for a long time, the resin particle is prevented from swelling or dissolving.

The reason for this is not clear, but it is presumed that the reason is as follows.

The polyimide precursor solution is classified into an organic solvent polyimide precursor solution using an organic solvent as a solvent and an aqueous polyimide precursor solution using water.

In the organic solvent polyimide precursor solution, by using a compound having a high boiling point as a solvent, the solvent remains during imidization and a degree of freedom of a molecular chain of the polyimide precursor may be increased, and thus an imidization ratio improves.

In the organic solvent polyimide precursor solution of the related art, which contains a resin particle, the polyimide precursor is dissolved while preventing the resin particle from dissolving, by using a mixed solvent of an organic solvent (for example, N,N-dimethylacetamide) that is a good solvent for the resin particle and the polyimide precursor and an organic solvent that is a poor solvent for the resin particle and the polyimide precursor.

However, when a liquid is stored for a long period of time, a surface of the resin particle may be swollen or slowly dissolved due to an influence of the good solvent, and fusion or dissolution of the particles may proceed to increase viscosity. In addition, when a ratio of the good solvent is reduced in order to prevent the resin particles from deteriorating with time, the solubility of the polyimide precursor may decrease over a long period of time and the polyimide precursor may be precipitated. The deterioration may cause a film defect during the production of a polyimide film, even when the deterioration cannot be visually confirmed.

According to the polyimide precursor solution according to the exemplary embodiment, two kinds of solvents in which the HSP distance from the resin particle is defined in a specific range are used and a mixed solvent in which the HSP distance from the polyimide precursor is set to a specific range is used. Accordingly, a state in which the resin particle is dispersed without dissolving in the organic solvent and the polyimide precursor dissolves in the organic solvent is easily maintained.

Specifically, the polyimide precursor solution according to the exemplary embodiment contains the polyimide precursor, the resin particle having 55% by weight or more of a structural unit derived from a styrene derivative, and the mixed solvent containing the first organic solvent (S1) and the second organic solvent (S2), and satisfies the conditions (1) to (4).

In the polyimide precursor solution according to the exemplary embodiment, as a resin particle, the resin particle having 55% by weight or more of the structural unit derived from the styrene derivative is used.

In addition, by using the first organic solvent (S1) and the second organic solvent (S2) which satisfy the conditions (2) and (3) as the solvent, the compatibility between the resin particle and the solvent is prevented from being exhibited and the resin particle is prevented from swelling or dissolving.

On the other hand, in order to maintain the solubility of the polyimide precursor in the solvent, a mixing ratio between the first organic solvent (S1) and the second organic solvent (S2) is adjusted to shorten the HSP distance between the mixed solvent and the polyimide precursor, that is, to satisfy the conditions (1) and (4).

By satisfying the conditions, the resin particle contained in the polyimide precursor solution is prevented from swelling or dissolving, and the solubility of the polyimide precursor in the solvent is maintained.

Therefore, it is presumed that, in the polyimide precursor solution according to the exemplary embodiment, even when stored for a long time, the resin particle is prevented from swelling or dissolving.

(Polyimide Precursor)

The polyimide precursor is obtained by polymerizing a tetracarboxylic dianhydride and a diamine compound. Specifically, the polyimide precursor is a resin (polyamic acid) having a repeating unit represented by formula (I).

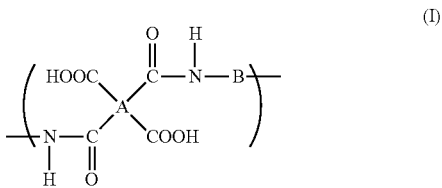

(In formula (I), A represents a tetravalent organic group, and B represents a divalent organic group.)

Here, in formula (I), the tetravalent organic group represented by A is a residue obtained by removing four carboxyl groups from a tetracarboxylic dianhydride as a raw material.

On the other hand, the divalent organic group represented by B is a residue obtained by removing two amino groups from a diamine compound as a raw material.

That is, the polyimide precursor having the repeating unit represented by formula (I) is a polymer of the tetracarboxylic dianhydride and the diamine compound.

Examples of the tetracarboxylic dianhydride include an aromatic compound and an aliphatic compound, and may be the aromatic compound. That is, in formula (I), the tetravalent organic group represented by A may be an aromatic organic group.

Examples thereof include pyromellitic anhydride, 3,3',4,4'-benzophenone tetracarboxylic dianhydride, 3,3',4,4'-diphenylsulfone tetracarboxylic dianhydride, 4,4'-oxydiphthalicanhydride, 3,4'-oxydiphthalicanhydride, 3,3',4,4'-biphenyltetracarboxylic dianhydride, 2,3,3',4'-biphenyltetracarboxylic dianhydride, 4,4'-(hexafluoroisopropylidene)diphthalic anhydride, 2,2-bis(3,4-dicarboxyphenyl)propane dianhydride, bis(3,4-dicarboxyphenyl)methane dianhydride, 1,4-bis(3,4-dicarboxyphenoxy)benzene dianhydride, 1,4-bis(2,3-dicarboxyphenoxy)benzene dianhydride, p-phenylene bis(trimellitate anhydride), m-phenylene bis(trimellitate anhydride), 2,2-bis[4-(3,4-dicarboxyphenoxy)phenyl]propane dianhydride, naphthalene-1,4,5,8-tetracarboxylic dianhydride, naphthalene-2,3,6,7-tetracarboxylic dianhydride, 9,9-bis(3,4-dicarboxyphenyl)fluorene dianhydride, 4,4'-diphenyl ether bis(trimellitate anhydride), 4,4'-diphenylmethane bis(trimellitate anhydride), 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenyletherdianhydride, 2,2-bis(4-hydroxyphenyl)propane bis(trimellitate anhydride), p-terphenyl tetracarboxylic dianhydride, and m-terphenyl tetracarboxylic dianhydride.

Examples of the aliphatic tetracarboxylic dianhydride include: aliphatic or alicyclic tetracarboxylic dianhydride such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentyl acetic acid dianhydride, 3,5,6-tricarboxynorbonane-2-acetic acid dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydride having an aromatic ring, such as 1,3,3a,4,5,9b-(hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these, as the tetracarboxylic dianhydride, the aromatic tetracarboxylic dianhydride may be used. Specifically, the pyromellitic anhydride, the 3,3',4,4'-benzophenone tetracarboxylic dianhydride, the 4,4'-oxydiphthalic anhydride, the 3,3',4,4'-biphenyltetracarboxylic dianhydride, or the 2,3,3',4'-biphenyltetracarboxylic dianhydride may be used. Furthermore, pyromellitic dianhydride, 3,3',4,4'-biphenyltetracarboxylic dianhydride, and the 3,3',4,4'-benzophenone tetracarboxylic dianhydride may be used. In particular, the 3,3',4,4'-biphenyltetracarboxylic dianhydride may be used.

The tetracarboxylic dianhydride may be used alone or two or more kinds thereof may be used in combination.

In addition, in a case where two or more kinds are used in combination, either the aromatic tetracarboxylic dianhydride or the aliphatic tetracarboxylic dianhydride may be used in combination, and the aromatic tetracarboxylic dianhydride and the aliphatic tetracarboxylic acid may be combined.

On the other hand, the diamine compound has two amino groups in a molecular structure. Examples of the diamine compound include an aromatic compound and an aliphatic compound, and may be the aromatic compound. That is, in formula (I), the divalent organic group represented by B may be an aromatic organic group.

Examples of the diamine compound include: aromatic diamine such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamine having two amino groups bonded to an aromatic ring such as diaminotetraphenylthiophene and a hetero atom other than a nitrogen atom of the amino groups; and aliphatic diamine and alicyclic diamine such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophorone diamine, tetrahydrodicyclopentadienylenediamine, hexahydro-4,7-methanoindanylene dimethylene diamine, tricyclo[6,2,1,02.7]-undecylenedimethyldiamine, and 4,4'-methylenebis (cyclohexylamine).

Among these, as the diamine compound, the aromatic diamine compound may be used. Specifically, for example, the p-phenylenediamine, the m-phenylenediamine, the 4,4'-diaminodiphenylmethane, the 4,4'-diaminodiphenyl ether, the 3,4'-diaminodiphenyl ether, the 4,4'-diaminodiphenyl sulfide, and the 4,4'-diaminodiphenyl sulfone may be used. In particular, the 4,4'-diaminodiphenyl ether and the p-phenylenediamine may be used.

In addition, the diamine compound may be used alone, and two or more kinds thereof may be used in combination. In addition, in a case where two or more kinds are used in combination, two or more of either the aromatic diamine compound or the aliphatic diamine compound may be used in combination, and the aromatic diamine compound and the aliphatic diamine compound may be used in combination.

In addition, it may be preferable to perform copolymerization in two or more kinds with respect to tetracarboxylic dianhydride and/or a diamine compound are used in order to control handleability and a mechanical property of a polyimide to be obtained.

Examples of the combination of copolymerization include: copolymerization of a tetracarboxylic dianhydride having one aromatic ring in the chemical structure and/or a diamine compound, and a tetracarboxylic dianhydride having two or more aromatic rings in the chemical structure and/or a diamine compound; and copolymerization of an aromatic tetracarboxylic dianhydride and/or a diamine compound and a carboxylic dianhydride having a flexible linking group such as an alkylene group, an alkyleneoxy group, and a siloxane group and/or a diamine compound.

A number average molecular weight of the polyimide precursor may be 1,000 or more and 150,000 or less, is more preferably 5,000 or more and 130,000 or less, and is further preferably 10,000 or more and 100,000 or less.

When the number average molecular weight of the polyimide precursor is in the range, solubility of the polyimide precursor in the solvent is prevented from deteriorating, and it is easy to secure a film-forming property.

The number average molecular weight of the polyimide precursor is measured by a gel permeation chromatography (GPC) method under measurement conditions described below.

Column: Tosoh TSK gel α-M (7.8 mm I.D×30 cm)
Eluent: Dimethylformamide (DMF)/30 mM LiBr/60 mM phosphoric acid
Flow rate: 0.6 mL/min
Injection volume: 60 μL
Detector: RI (differential refractive index detector)

A content (concentration) of the polyimide precursor may be 0.1% by weight or more and 40% by weight or less, is preferably 0.5% by weight or more and 25% by weight or less, and is more preferably 1% by weight or more and 20% by weight or less, with respect to the total amount of the polyimide precursor solution.

(Resin Particle)

The polyimide precursor solution according to the exemplary embodiment contains the resin particle.

The resin particle is formed of a resin containing a styrene derivative as a structural unit and containing the structural unit derived from the styrene derivative in an amount of 55% by weight or more.

The styrene derivative is a compound having a styrene skeleton.

Examples of the styrene derivative include styrenes having a styrene skeleton such as styrene (unsubstituted styrene), alkyl-substituted styrene (such as α-methylstyrene, 2-methylstyrene, 3-methylstyrene, 4-methylstyrene, 2-ethylstyrene, 3-ethylstyrene, and 4-ethylstyrene), halogen-substituted styrene (such as 2-chlorostyrene, 3-chlorostyrene, and 4-chlorostyrene), and styrenes substituted with other functional groups (such as 3-acetoxystyrene, 4-acetoxystyrene, and methyl 4-vinylbenzoate).

When the content of the structural unit derived from the styrene derivative in the resin particle is 55% by weight or more, an affinity with the solvent decreases and the resin particle is prevented from swelling or dissolving.

From the viewpoint of preventing the resin particle from swelling of dissolving, the structural unit derived from the styrene derivative in the resin particle is preferably 70% by weight or more, more preferably 85% by weight or more, and further preferably 100% by weight.

The resin particle may contain structural units other than the styrene derivative.

Examples of the structural units other than the styrene derivative include: (meth)acrylic acid esters such as methyl (meth)acrylate, ethyl (meth)acrylate, n-propyl acrylate (meth), n-butyl acrylate (meth), lauryl (meth)acrylate, 2-ethylhexyl (meth)acrylate, and benzyl (meth)acrylate; vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; acids such as (meth) acrylic acid, maleic acid, cinnamic acid, fumaric acid, and vinyl sulfonic acid; bases such as ethyleneimine, vinylpyridine, and vinylamine; and monomers such as vinyl acetate.

The structural unit other than the styrene derivative may be only one included or two or more kinds thereof may be included.

In a case where the resin particle includes a structure other than the styrenes, a copolymer of at least one styrene and at least one monomer selected from (meth)acrylic acid ester or (meth)acrylic acid is preferable, from the viewpoint of manufacturability and adaptability in a particle removing step to be described later. Further, a copolymer of styrene and the (meth)acrylic acid ester (the carbon number of the ester portion is 4 or less) is more preferable, and a copolymer of styrene and methyl (meth)acrylate is most preferable.

Here, "(meth)acrylic" has a meaning including both "acrylic" and "methacrylic".

A shape of the resin particle may be spherical. In the use of the spherical resin particle, the particle is removed from a polyimide film to produce a porous polyimide film, and thus, a porous polyimide film having spherical pores may be obtained.

In the exemplary embodiment, the "spherical shape" in the resin particle includes both spherical shape and substantially spherical shape (shape close to the spherical shape). Specifically, the "spherical shape" means that particles having a ratio of a major axis to a minor axis (major axis/minor axis) of 1 or more and less than 1.5 are present in a proportion of more than 80%. The proportion of particles having the ratio of the major axis to the minor axis (major axis/minor axis) of 1 or more and less than 1.5 is preferably 90% or more. As the ratio of the major axis to the minor axis approaches 1, the shape becomes closer to a true sphere.

A volume average particle diameter $D50v$ of the resin particles is not particularly limited. The volume average particle diameter $D50v$ of the resin particles may be, for example, 0.05 μm or more and 10 μm or less.

A volume particle size distribution index (GSDv) of the resin particles is preferably 1.30 or less.

The volume particle size distribution index of the resin particles is calculated as $(D84v/D16v)^{1/2}$ from a particle size distribution of particles contained in the polyimide precursor solution.

The particle size distribution of the particles in the polyimide precursor solution is measured as follows. The solution to be measured is diluted, and the particle size distribution of the particles in a liquid is measured using a COULTER COUNTER LS13 (manufactured by Beckman Coulter, Inc.). The particle size distribution is measured, based on the measured particle size distribution, by drawing the volume cumulative distribution from a smaller diameter side with respect to divided particle size ranges (channels).

Then, in the volume cumulative distribution drawn from the smaller diameter side, a particle diameter at which the accumulation is 16% is a volume particle diameter D16v, a particle diameter at which the accumulation is 50% is a volume average particle diameter D50v, and a particle diameter at which the accumulation is 84% is a volume particle diameter D84v.

In the polyimide precursor solution according to the exemplary embodiment, the resin particle is preferably contained in a volume ratio of 20% or more and 80% or less, and more preferably in a volume ratio of 30% or more and 75% or less, with respect to a total volume of a solid content of the polyimide precursor and the resin particle.

A method of measuring the volume ratio is as follows.

The volume ratio of the particles with respect to the total volume of the solid content of the polyimide precursor and the resin particle represents a volume ratio of particles occupying a polyimide film produced by using the polyimide precursor according to the exemplary embodiment. The volume ratio of particles occupying the polyimide film is obtained by observing a cut surface, which is provided by cutting the polyimide film along the film thickness direction, with a scanning electron microscope (SEM) and employing the following method.

In an SEM image, a predetermined area S in the polyimide film is specified, and a total area A of the particles contained in the area S is determined. Assuming that the polyimide film is homogeneous, a value obtained by dividing the total area A of the particles by the area S is converted into a percentage (%) to obtain the volume ratio of the particles occupying the polyimide film. The area S is a sufficiently large area for a size of the particles. For example, the size of the area S is set to include 100 or more particles. The area S may be the total of plural cut surfaces.

The content of the resin particle contained in the polyimide precursor solution according to the exemplary embodiment may be 0.1% by weight or more and 40% by weight or less, and is preferably 0.5% by weight or more and 30% by weight or less, and more preferably 1% by weight or more and 30% by weight or less, with respect to the total weight of the polyimide precursor solution.

A weight ratio of the resin particles to the total weight of the solid content (polyimide precursor+resin particles) may be 15% by weight or more and 80% by weight or less, is preferably 20% by weight or more and 75% by weight or less, and more preferably 30% by weight or more and 70% by weight or less.

The solid content may be 1% by weight or more and 60% by weight or less, is preferably 5% by weight or more and 50% by weight or less, and more preferably 10% by weight or more and 45% by weight or less, with respect to the total weight of the polyimide precursor solution.

The resin particle favorably maintains the shape of the particles in a process of producing the polyimide precursor solution according to the exemplary embodiment, and in a process of applying the polyimide precursor solution when producing the polyimide film and drying the coating film (before removing the resin particle). From this point of view, a glass transition temperature of the resin particle may be 60° C. or higher, is preferably 70° C. or higher, and more preferably 80° C. or higher.

The glass transition temperature is obtained based on a DSC curve obtained by differential scanning calorimetry (DSC), and more specifically, is obtained in accordance with "extrapolated glass transition start temperature" described in Glass transition temperature obtaining method in JIS K 7121-1987 "Plastic transition temperature measurement method".

A method for synthesizing the resin particle is not particularly limited, and known polymerization methods (radical polymerization methods such as emulsion polymerization, soap-free emulsion polymerization, suspension polymerization, miniemulsion polymerization and microemulsion polymerization) may be applied.

The resin particle is in a state where the resin particle does not dissolve but is dispersed in the polyimide precursor solution according to the exemplary embodiment. In the exemplary embodiment, the resin particle may be removed from the produced polyimide film.

Here, in the exemplary embodiment, the expression "the resin particle does not dissolve" means including the case where the resin particle dissolves in a target liquid within a range of 3% by weight or less at 25° C., as well as the case where the resin particle does not dissolve in the target liquid at 25° C.

The polyimide precursor solution may contain a particle other than the resin particle.

Examples of the particle other than the resin particle include an inorganic particle.

In specific, as the inorganic particle, for example, inorganic particles such as a silica (silicon dioxide) particle, a magnesium oxide particle, an alumina particle, a zirconia particle, a calcium carbonate particle, a calcium oxide particle, a titanium dioxide particle, a zinc oxide particle, and a cerium oxide particle are mentioned. A shape of the particle may be spherical as described above. From this viewpoint, as the inorganic particle, inorganic particles such as the silica particle, the magnesium oxide particle, the calcium carbonate particle, and the alumina particle are preferable, inorganic particles such as the silica particle, the titanium oxide particle, and the alumina particle are more preferable, and the silica particle is further preferable. These inorganic particles may be used alone or two or more kinds thereof may be used in combination.

A content of the particle other than the resin particle contained in the polyimide precursor solution according to the exemplary embodiment may be 0.1% by weight or more and 10% by weight or less, with respect to the total weight of the polyimide precursor solution.

(Property of Polyimide Precursor Solution)

The polyimide precursor solution according to the exemplary embodiment satisfies the following conditions (1) to (4).

Condition (1): The weight ratio (S1/S2) of the first organic solvent (S1) to the second organic solvent (S2) is from 50/50 to 90/10.

Condition (2): The HSP distance between the first organic solvent (S1) and the resin particle is 11 or more and less than 16.

Condition (3): The HSP distance between the second organic solvent (S2) and the resin particle is 16 or more.

Condition (4): The HSP distance between the mixed solvent and the polyimide precursor is 12 or less.

When the polyimide precursor solution satisfies the condition (1), the resin particle may be prevented from dissolving or swelling while maintaining the solubility of the polyimide precursor in the mixed solvent.

When the polyimide precursor solution satisfies the conditions (2) and (3), the affinity of the resin particle with the first organic solvent (S) and the second organic solvent (S2) deteriorates, and the resin particle may be prevented from dissolving or swelling.

When the polyimide precursor solution satisfies the condition (4), the polyimide precursor dissolves easily in the mixed solvent.

From the viewpoint of preventing the resin particle from swelling or dissolving, it is preferable that the polyimide precursor solution further satisfies the following conditions (12) to (14).

Condition (12): The HSP distance between the first organic solvent (S1) and the resin particle is 11 or more and less than 16 and the HSP distance between the first organic solvent (S1) and the polyimide precursor is 11 or less.

Condition (13): The HSP distance between the second organic solvent (S2) and the resin particle is 17 or more.

Condition (14): The HSP distance between the mixed solvent and the polyimide precursor is 11 or less.

From the viewpoint of preventing the resin particle from swelling or dissolving, it is more preferable that the polyimide precursor solution further satisfies the following conditions (111) to (114).

Condition (111): The weight ratio (S1/S2) of the first organic solvent (S) to the second organic solvent (S2) is from 60/40 and 80/20.

Condition (112): The HSP distance between the first organic solvent (S1) and the resin particle is 13 or more and less than 16 and the HSP distance between the first organic solvent (S1) and the polyimide precursor is 10.5 or less.

Condition (113): The HSP distance between the second organic solvent (S2) and the resin particle is 18 or more.

Condition (114): The HSP distance between the mixed solvent and the polyimide precursor is 10.5 or less.

Here, the HSP will be described. The HSP is the Hansen solubility parameter. The HSP is a value obtained by quantifying the solubility of a certain substance (X) in another substance (Z) using a multidimensional vector. It is shown that the shorter the distance between vectors of the X and the Z, the easier the dissolution (the higher the compatibility).

The HSP is calculated using HSPiP software (HSPiP ver. 4.1.07). In the calculation of the HSP distance, first, three vectors ($\delta D$ (dispersion term), $\delta P$ (polarization term), and $\delta H$ (hydrogen bond term)) are determined. The HSP distance is a value calculated by applying the $\delta D$ (dispersion term), the $\delta P$ (polarization term), and the $\delta H$ (hydrogen bond term) of two kinds of objects to an equation shown below.

For example, the HSP distance between the polyimide precursor and the mixed solvent may be obtained by applying a dispersion term $\delta D_1$, a polarization term $\delta P_1$, and a hydrogen bond term $\delta H_1$ of the polyimide precursor and a dispersion term $\delta D_2$, a polarization term $\delta P_2$, and a hydrogen bond term $\delta H_2$ of the mixed solvent to the equation shown below.

$$\text{HSP distance} = \{4 \times (\delta D_1 - \delta D_2)^2 + (\delta P_1 - \delta P_2)^2 + (\delta H_1 - \delta H_2)^2\}^{0.5}$$

The HSPs ($\delta D$, $\delta P$, $\delta H$) of various known polymers and solvents are stored in a database (attached to the software HSPiP ver. 4.1.07). In a case where the HSP of the polymer and solvent to be used is stored in a database and the HSP is known, the HSP distance is calculated using the numerical values described in the database.

On the other hand, for a new compound that is not stored in the database, the HSP is calculated based on a chemical structural formula using the software HSPiP. In a case of a polymer, when a copolymer is obtained from monomers whose HSP are known, an HSP of the polymer may be calculated from the HSP of the monomers.

In this manner, the HSP distance is obtained by calculation, and the solubility of a certain substance in a certain solvent may be estimated based thereon.

In the polyimide precursor solution according to the exemplary embodiment, the HSP of the mixed solvent is calculated as the sum of values obtained by multiplying the HSP value of each individual compound by the weight ratio. For example, in a case where HSP of a solvent A ($\delta D_A$, $\delta P_A$, and $\delta H_A$) and HSP of a solvent B ($\delta D_B$, $\delta P_B$, and $\delta H_B$) are mixed at a weight ratio of a:b (a+b=1), the HSP of the mixed solvent are (a×$\delta D_A$+b×$\delta D_B$, a×$\delta P_A$+b×$\delta P_B$, and a×$\delta H_A$+b×$\delta H_B$).

In the polyimide precursor solution according to the exemplary embodiment, a method of selecting the organic solvent is as follows.

First, the resin particles and the polyimide precursor to be used are determined, and HSPs thereof are obtained.

Kinds of the solvents (S1) and (S2) and the mixing ratio thereof are selected such that the conditions (2) to (4) in terms of the HSP distance described above are satisfied.

As an example, Table 1 shows HSPs of a polyimide precursor-1, a polyimide precursor-2 to be used in Examples to be described later, and the homopolymers of each monomer to be used in synthesis of resin particles including a copolymer. Table 2 shows HSPs of the organic solvents to be used in Examples to be described later.

The HSP of the polyimide precursor is calculated from the chemical structural formula of the repeating unit using commercially available software HSPiP. The HSPs of the organic solvents are stored in a database and used. In addition, the HSP of the resin particle including the copolymer to be used in Examples may be calculated from the sum of values multiplied by a copolymerization weight ratio in the same manner as in the case of the mixed solvent, by using the known value of the HSP of the homopolymer of each monomer.

TABLE 1

|  | $\delta D$ | $\delta P$ | $\delta H$ |
| --- | --- | --- | --- |
| Polyimide precursor-1 | 22.6 | 13.5 | 14.4 |
| Polyimide precursor-2 | 22.7 | 13.6 | 15.0 |
| Homopolymer of styrene | 18.5 | 4.5 | 2.9 |
| Homopolymer of MMA | 18.6 | 10.5 | 5.1 |
| Homopolymer of EMA | 17.6 | 9.7 | 4.0 |
| Homopolymer of BA | 16.2 | 9.0 | 3.0 |

TABLE 2

|  | $\delta D$ | $\delta P$ | $\delta H$ | Boiling point (° C.) |
| --- | --- | --- | --- | --- |
| DMSO | 18.4 | 16.4 | 10.2 | 189 |
| DMAc | 16.8 | 11.5 | 10.2 | 165 |

TABLE 2-continued

| | δD | δP | δH | Boiling point (° C.) |
|---|---|---|---|---|
| GBL | 18.0 | 16.6 | 7.4 | 204 |
| CL | 19.7 | 15.0 | 7.4 | 253 |
| FA | 17.4 | 7.6 | 15.1 | 170 |
| EG | 17.0 | 11.0 | 26.0 | 197 |
| EtOH | 15.8 | 8.8 | 19.4 | 78 |
| PG | 16.8 | 10.4 | 21.3 | 182 |
| EG-Me | 16.0 | 8.2 | 15.0 | 124 |
| Methyl lactate | 16.9 | 8.3 | 16.1 | 144 |
| DEG | 16.6 | 12.0 | 19.0 | 245 |
| DPG | 16.5 | 10.6 | 17.7 | 232 |
| EC | 18.0 | 21.7 | 5.1 | 261 |

For reference, Table 3 shows the HSP distance between each organic solvent and polystyrene (PSt) particles.

TABLE 3

| Solvents | HSP distance from PSt |
|---|---|
| Toluene | 3.38 |
| Chloroform | 3.43 |
| Xylene | 3.94 |
| Cyclohexanone | 4.69 |
| Tributyl Phosphate | 4.96 |
| THF | 6.25 |
| n-Butyl Acetate | 6.43 |
| Methyl Iso-Butyl Ketone (MIBK) | 6.71 |
| Methyl Ethyl Ketone (MEK) | 7.08 |
| DMI | 7.59 |
| γ-Valerolactone | 8.41 |
| Dipropylene glycol methyl ether | 8.80 |
| N-Methyl-2-Pyrrolidone (NMP) | 8.96 |
| Propylene Glycol Monomethyl Ether Acetate | 9.08 |
| Acetone | 9.36 |
| Tetramethylurea | 9.61 |
| δ-Valerolactone | 10.02 |
| Propylene Glycol Monomethyl Ether | 10.61 |
| N,N-Dimethyl Acetamide (DMAc) | 10.67 |
| Tetrahydrofurfuryl Alcohol | 10.75 |
| Benzyl Alcohol | 10.95 |
| Ethyl Lactate | 11.26 |
| Carprolactone (Epsilon) | 11.67 |
| iso-Pentyl Alcohol | 11.74 |
| FurFuryl alcohol | 12.78 |
| γ-Butyrolactone (GBL) | 12.95 |
| t-Butyl Alcohol | 13.53 |
| Ethylene Glycol Monomethyl Ether | 13.61 |
| Propylene Carbonate | 13.88 |
| 1-Butanol | 13.89 |
| Dimethyl Sulfoxide (DMSO) | 13.96 |
| Methyl lactate | 14.10 |
| Iso-Butanol | 14.72 |
| Acetonitrile | 15.28 |
| 1-Propanol | 15.51 |
| Dipropylene Glycol | 16.50 |
| Ethylene Carbonate | 17.37 |
| Ethanol | 17.89 |
| Diethylene glycol | 18.16 |
| Propylene Glycol | 19.62 |
| Ethylene Glycol | 24.18 |
| Glycerine | 25.33 |

(Mixed Solvent)

The polyimide precursor solution according to the exemplary embodiment contains the mixed solvent containing the first organic solvent (S1) and the second organic solvent (S2).

—First Organic Solvent (S1)—

Examples of the first organic solvent (S1) include esters (compounds having an ester group), lactones (compounds having a lactone structure), alcohols (compounds having one hydroxy group), glycols (compounds having two hydroxy groups), glycol monoethers (monoether compounds of glycols), carbonates (compounds having a carbonate group), sulfoxides (compounds in which two hydrocarbon groups are bound to a sulfinyl group), and nitriles (compounds with nitrile groups).

Examples of the esters include methyl lactate and ethyl lactate.

Examples of the lactones include ε-caprolactone and γ-butyrolactone.

Examples of alcohols include isopentyl alcohol, furfuryl alcohol, tert-butyl alcohol, 1-butyl alcohol, 1-propanol, and isobutyl alcohol.

Examples of glycols and glycol monoethers include ethylene glycol monomethyl ether and dipropylene glycol.

Examples of the carbonates include ethylene carbonate and propylene carbonate.

Examples of the sulfoxides include dimethyl sulfoxide.

Examples of the nitriles include acetonitrile.

The first organic solvent (S1) is preferably at least one selected from the group consisting of dimethyl sulfoxide, γ-butyrolactone, ε-caprolactone, and furfuryl alcohol, and more preferably dimethyl sulfoxide, from the viewpoint of preventing the resin particle from swelling or dissolving.

The first organic solvent (S1) may be used alone or two or more kinds thereof may be used in combination.

A content of the first organic solvent (S) contained in the polyimide precursor solution according to the exemplary embodiment is preferably 10% by weight or more and 50% by weight or less, more preferably 20% by weight or more and 44% by weight or less, and further preferably 30% by weight or more and 44% by weight or less, with respect to the total weight of the polyimide precursor solution.

A boiling point of the first organic solvent (S1) is preferably 150° C. or higher and 250° C. or lower, more preferably 170° C. or higher and 250° C. or lower, and further preferably 180° C. or higher and 250° C. or lower, from the viewpoint of increasing the imidization ratio during the production step of the polyimide film.

—Second Organic Solvent (S2)—

Examples of the second organic solvent (S2) include glycols (compounds having two hydroxy groups), glycerins (compounds having a glycerin skeleton), alcohols (compounds having one hydroxy group), and carbonates (compounds having a carbonate group).

Examples of the glycols include ethylene glycol, diethylene glycol, propylene glycol, and dipropylene glycol.

Examples of the glycerins include glycerin.

Examples of alcohols include ethanol.

Examples of the carbonates include ethylene carbonate.

The second organic solvent (S2) is preferably at least one selected from the group consisting of ethylene glycol, diethylene glycol, propylene glycol, and dipropylene glycol, more preferably at least one selected from the group consisting of ethylene glycol and propylene glycol, from the viewpoint of preventing the resin particle from swelling or dissolving.

The second organic solvent (S2) may be used alone or two or more kinds thereof may be used in combination.

From the viewpoint of preventing the resin particle from swelling or dissolving, a content of the second organic solvent (S2) is preferably 60% by weight or more, more preferably 65% by weight or more, and further preferably 100% by weight or more, with respect to the resin particle.

The content of the second organic solvent (S2) contained in the polyimide precursor solution according to the exemplary embodiment is preferably 8% by weight or more and 28% by weight or less, more preferably 11% by weight or more and 22% by weight or less, and further preferably 11% by weight or more and 17% by weight or less, with respect to the total weight of the polyimide precursor solution.

A boiling point of the second organic solvent (S2) is preferably 150° C. or higher and 260° C. or lower, more preferably 170° C. or higher and 260° C. or lower, and further preferably 180° C. or higher and 260° C. or lower, from the viewpoint of increasing the imidization ratio during the production step of the polyimide film.

A boiling point difference (absolute value) between the first organic solvent (S1) and the second organic solvent (S2) is 0° C. or higher and 30° C. or lower, more preferably 0° C. or higher and 20° C. or lower, and further preferably 0° C. or higher and 10° C. or lower, from the viewpoint of maintaining the constant solvent ratio during the production step of the polyimide film.

(Other Additives)

The polyimide precursor solution according to the exemplary embodiment may include an additive other than the polyimide precursor, the resin particle, and the mixed solvent.

As the other additive, an anionic surfactant and water are preferable.

—Anionic Surfactant—

The polyimide precursor solution according to the exemplary embodiment favorably contains an anionic surfactant as the other additive.

The resin particle is further prevented from swelling or dissolving in a case where the anionic surfactant is included in the polyimide precursor solution.

The reason for this is not clear, but it is presumed that the reason is as follows.

When the anionic surfactant is included in the polyimide precursor solution, the anionic surfactant is adsorbed on a surface of the resin particle. Accordingly, a contact area between the resin particle and the solvent is reduced. Since the anionic surfactant has ionicity, the affinity between the solvent and the particle surface deteriorates, as compared to a case of using a nonionic surfactant, and therefore, the particle may be further prevented from swelling or dissolving.

Therefore, it is considered that the resin particle is further prevented from swelling or dissolving.

Examples of the anionic surfactant include fatty acid salts, abietic acid salts, hydroxyalkane sulfonates, alkane sulfonates, dialkyl sulfosuccinates, alkylbenzene sulfonates, alkyl naphthalene sulfonates, alkylphenoxy polyoxyethylene propyl sulfonates, polyoxyethylene alkylsulfophenyl ether salts, N-methyl-N-oleyl taurine sodium salts, N-alkylsulfosuccinic acid monoamide disodium salts, petroleum sulfonates, hardened castor oil, sulfated tallow oil, sulfate ester salts of fatty acid alkyl esters, alkyl sulfate ester salts, polyoxyethylene alkyl ether sulfate ester salts, fatty acid monoglyceride sulfate ester salts, polyoxyethylene alkyl phenyl ether sulfate ester salts, polyoxyethylene styryl phenyl ether sulfate ester salts, alkyl phosphate ester salts, polyoxyethylene alkyl ether phosphate ester salts, polyoxyethylene alkylphenyl ether phosphate ester salts, partially saponified products of styrene-maleic anhydride copolymer, partially saponified products of olefin-maleic anhydride copolymer, and naphthalene sulfonate formalin condensates.

Among these, the alkane sulfonates and the alkylbenzene sulfonates are particularly preferable.

Examples of the alkane sulfonates include sodium n-octyl sulfate, sodium 2-ethylhexyl sulfate, sodium n-decyl sulfate, and sodium lauryl sulfate.

Examples of the alkylbenzene sulfonates include alkyldiphenyl ether disulfonate, sodium dodecylbenzene sulfonate, sodium decylbenzene sulfonate, and sodium cetylbenzene sulfonate.

The polyimide precursor solution according to the exemplary embodiment may contain one kind of anionic surfactant alone or contain two or more kinds thereof, as the other additive.

A content of the anionic surfactant is preferably 0.01% by weight or more and 3% by weight or less, more preferably 0.05% by weight or more and 2.5% by weight or less, and further preferably 0.1% by weight or more and 2% by weight or less, with respect to the resin particle.

The content of the anionic surfactant is preferably 0.0025% by weight or more and 1% by weight or less, more preferably 0.005% by weight or more and 0.75% by weight or less, and further preferably 0.01% by weight or more and 0.5% by weight or less, with respect to the total weight of the polyimide precursor solution.

In a case where the resin particle is produced by emulsion polymerization or the like, the anionic surfactant may be incorporated in the polyimide precursor solution by adding the resin particle having the anionic surfactant remaining thereon to the polyimide precursor solution.

Also, the anionic surfactant may be separately added to the polyimide precursor solution in order to be incorporated into the polyimide precursor solution.

—Water—

The polyimide precursor solution according to the exemplary embodiment favorably contains water as the other additive.

The resin particle is further prevented from swelling or dissolving, in a case where water is included in the polyimide precursor solution.

The reason for this is not clear, but it is presumed that the reason is as follows.

When water is included in the polyimide precursor solution, water is coordinated in the vicinity of the anionic surfactant that surrounds the particle, so that swelling by the organic solvent may further be prevented from occurring.

Therefore, it is considered that the resin particle is further prevented from swelling or dissolving.

Examples of the water include distilled water, ion-exchanged water, ultrafiltration water, and pure water.

A content of the water is preferably 0.5% by weight or more and 5% by weight or less, more preferably 1% by weight or more and 10% by weight or less, and further preferably 1% by weight or more and 5% by weight or less, with respect to the resin particle.

The content of water is preferably 0.2% by weight or more and 2% by weight or less, more preferably 0.2% by weight or more and 1% by weight or less, and further preferably 0.2% by weight or more and 0.5% by weight or less, with respect to the entire polyimide precursor solution.

In a case where the resin particle is produced by emulsion polymerization or the like, the water may be incorporated in the polyimide precursor solution by adding the resin particle having water remaining therein to the polyimide precursor solution.

Also, the water may be separately added to the polyimide precursor solution in order to be incorporated in the polyimide precursor solution.

—Additives Other than Anionic Surfactant and Water—

The polyimide precursor solution according to the exemplary embodiment may include a catalyst for accelerating an imidization reaction, a leveling material for improving film-forming quality, and the like.

As the catalyst for accelerating the imidization reaction, a dehydrating agent such as an acid anhydride, an acid catalyst such as a phenol derivative, a sulfonic acid derivative, or a benzoic acid derivative, and the like may be used.

In addition, the polyimide precursor solution may include, for example, a conductive material (conductivity (for example, having a volume resistivity of lower than $10^7$ Ω·cm) or semiconductivity (for example, having a volume resistivity of $10^7$ Ω·cm or higher and $10^{13}$ Ω·cm or lower)), which is added to impart conductivity, depending on the purpose of use of the porous polyimide film.

Examples of the conductive material include carbon black (such as acidic carbon black having a pH of 5.0 or less); metal (such as aluminum and nickel); metal oxide (such as yttrium oxide and tin oxide); and ion conductive substance (such as potassium titanate and LiCl). These conductive materials may be used alone or two or more kinds thereof may be used in combination.

In addition, the polyimide precursor solution may contain an inorganic particle to be added for improving mechanical strength, depending on the purpose of use of the porous polyimide film. Examples of the inorganic particle include particulate materials such as silica powder, alumina powder, barium sulfate powder, titanium oxide powder, mica, and talc. In addition, $LiCoO_2$, $LiMn_2O$, or the like used as an electrode of a lithium ion battery may be included.

(Method for Producing Porous Polyimide Film)

Hereinafter, an example of a preferable production method for the porous polyimide film according to the exemplary embodiment will be described.

The porous polyimide film according to the exemplary embodiment has, for example, steps described below.

First step of applying the polyimide precursor solution containing a resin particle and a polyimide precursor to form a coating film and then drying the coating film to form a coat containing the polyimide precursor and the resin particle.

Second step of heating the coat and imidizing the polyimide precursor to form a polyimide film, and removing the resin particle.

In the description of the production method, the same reference numerals are given to the same components in reference FIG. 1. With respect to the reference numerals in FIG. 1, 31 indicates a substrate, 51 indicates a release layer, 10A indicates a pore, and 10 indicates a porous polyimide film.

(First Step)

In the first step, first, a polyimide precursor solution (resin particle-dispersed polyimide precursor solution) containing resin particles and a polyimide precursor is prepared.

Examples of the method for producing the resin particle-dispersed polyimide precursor solution according to the exemplary embodiment include a method using (i) and (ii) described below.

(i) Method of producing a polyimide precursor solution, and mixing and dispersing resin particles (powder or organic solvent dispersion) in the polyimide precursor solution.

(ii) Method of synthesizing a polyimide precursor in an organic solvent dispersion containing resin particles.

(i) Method of Mixing and Dispersing Resin Particles (Powder or Organic Solvent Dispersion) after Producing a Polyimide Precursor Solution First, for producing a polyimide precursor solution before dispersing the resin particles, a method of polymerizing a tetracarboxylic dianhydride and a diamine compound in an organic solvent according to a known method to produce a resin (polyimide precursor) is mentioned.

Next, the obtained polyimide precursor solution is mixed with the resin particle described in the section of Resin particle, which is in the form of powder or an organic solvent dispersion, with stirring. Alternatively, the resin particle powder may be redispersed in an organic solvent (which may be used alone or in a mixed solvent) in which the resin particles do not dissolve, and the resultant dispersion may be then mixed and stirred with the polyimide precursor solution.

Methods of mixing, stirring, and dispersing are not particularly limited. Also, in order to improve the dispersibility of the resin particles, a known nonionic or ionic surfactant may be added.

A particle size distribution of the resin particles in the organic solvent solution of the resin particle-dispersed polyimide precursor is measured as follows. The solution to be measured is diluted, and the particle size distribution of the particles in the liquid is measured using a COULTER COUNTER LS13 (manufactured by Beckman Coulter, Inc.). The particle size distribution is measured by, based on the measured particle size distribution, drawing the volume cumulative distribution from a smaller diameter side with respect to divided particle size ranges (channels).

Then, in the volume cumulative distribution drawn from the smaller diameter side, a particle diameter at which the accumulation is 16% is a volume particle diameter D16v, a particle diameter at which the accumulation is 50% is a volume average particle diameter D50v, and a particle diameter at which the accumulation is 84% is a volume particle diameter D84v.

In a case where the volume particle size distribution of particles in the resin particle-dispersed polyimide precursor solution of the exemplary embodiment is difficult to measure by the method above, the volume particle size distribution is measured by a method such as a dynamic light scattering method.

(ii) Method of Synthesizing Polyimide Precursor in Organic Solvent Dispersion Containing Resin Particles First, a solution in which resin particles are dispersed in an organic solvent without dissolving, provided that a polyimide precursor to be produced is capable of dissolving in the organic solvent, is prepared. Next, a tetracarboxylic dianhydride and a diamine compound are polymerized in the solution to produce a resin (polyimide precursor) and an organic solvent solution of the resin particle-dispersed polyimide precursor is obtained.

The resin particle-dispersed polyimide precursor solution obtained by the above method is applied onto a substrate to form a coating film containing the polyimide precursor solution and the particles. Then, the coating film formed on the substrate is dried to form a dried film, i.e., a coat containing the polyimide precursor and the particles.

The substrate on which the particle-dispersed polyimide precursor solution is applied is not particularly limited. Examples thereof include a substrate made of resin such as polystyrene and polyethylene terephthalate; a glass substrate; a ceramic substrate; a substrate made of metal such as iron and stainless steel (SUS); and a substrate made of a composite material obtained by combining these materials. In addition, the substrate may be provided with a release layer, if necessary, by performing a release treatment with a silicone or fluorine release agent, or the like.

A method of applying the particle-dispersed polyimide precursor solution onto the substrate is not particularly limited. Examples thereof include various methods such as a spray coating method, a spin coating method, a roll coating method, a bar coating method, a slit die coating method, and an ink jet coating method.

An applied amount of the polyimide precursor solution for obtaining a coating film containing the polyimide precursor solution and the particles may be set to an amount capable of obtaining a predetermined film thickness.

The coating film containing the polyimide precursor solution and the particles is formed and then dried to form a coat containing the polyimide precursor and the particles. Specifically, the coating film containing the polyimide precursor solution and the particles is dried by a method such as heat drying, natural drying, or vacuum drying to form the coat. More specifically, the coating film is dried such that the solvent remaining in the coat is 50% or less, preferably 30% or less with respect to the solid content of the coat to form the coat.

(Second Step)

The second step is a step of heating the coat which is obtained in the first step and contains the polyimide precursor and the particles to imidize the polyimide precursor, thereby forming a polyimide film. Then, the second step includes a treatment of removing the particles. A porous polyimide film is obtained through a treatment of removing the particles.

In the second step, specifically, in the step of forming the polyimide film, the coat which is obtained in the first step and contains the polyimide precursor and the particles is heated to proceed with imidization, and further heated to form a polyimide film in which the imidization has proceeded. As the imidization proceeds and the imidization ratio increases, the polyimide becomes difficult to dissolve in an organic solvent.

Then, in the second step, a treatment of removing the particles is performed. Regarding removal of the particles, the particles may be removed in the process of heating the coat to imidize the polyimide precursor, or may be removed from the polyimide film after the imidization is completed (after imidization).

In the exemplary embodiment, the process of imidizing the polyimide precursor refers to a process in which the coat which is obtained in the first step and contains the polyimide precursor and the particles is heated to proceed with imidization such that the coat is in a state before the polyimide film after the imidization is completed.

From the viewpoint of particle removability or the like, it is preferable to perform the treatment for removing the particles when the imidization ratio of the polyimide precursor in the polyimide film is 10% or more in the process of imidizing the polyimide precursor. When the imidization ratio is 10% or more, it is easy to maintain the shape.

Next, the treatment of removing the particles will be described.

First, the treatment of removing the resin particles will be described.

Examples of the treatment of removing the resin particles include a method of removing the resin particles by heating, a method of removing the resin particles with an organic solvent that dissolves the resin particles, and a method of removing the resin particles by decomposition with a laser or the like. Among these, the method of removing the resin particles by heating and the method of removing the resin particles with the organic solvent that dissolves the resin particles are preferable.

As the method of removing the resin particles by heating, for example, in the process of imidizing the polyimide precursor, the resin particles may be removed by decomposing the resin particles by heating for proceeding with the imidization. In this case, it is effective for reducing a step, from the point that there is no operation of removing the resin particles using a solvent.

Examples of the method of removing the resin particles with an organic solvent that dissolves the resin particles include a method of bringing the resin particles into contact with an organic solvent that dissolves the resin particles (for example, immersing in a solvent) to dissolve and remove the resin particles. In this state, immersion in a solvent is preferable, from the point that dissolution efficiency of the resin particles increases.

The organic solvent that dissolves the resin particles for removing the resin particles is not particularly limited, as long as, in the organic solvent, the polyimide film before imidization is completed and the polyimide film after imidization is completed do not dissolve and the resin particles are soluble. Examples thereof include ethers such as tetrahydrofuran (THF); aromatics such as toluene; ketones such as acetone; and esters such as ethyl acetate.

In a case where the resin particles are removed by dissolution to obtain a porous state, it is preferable that the resin particles dissolve in a general-purpose solvent such as tetrahydrofuran, acetone, toluene, and ethyl acetate. Water may also be used depending on the resin particles and the polyimide precursor to be used.

In a case where the resin particles are removed by heating to obtain a porous state, the resin particles are not decomposed at a drying temperature after application, but are thermally decomposed at a temperature at which the polyimide precursor coat is imidized. From this viewpoint, the thermal decomposition starting temperature of the resin particles may be 150° C. or higher and 320° C. or lower, is preferably 180° C. or higher and 300° C. or lower, and more preferably 200° C. or higher and 280° C. or lower.

Here, the treatment of removing inorganic particles in a case where the polyimide precursor solution contains the inorganic particles will be described.

Examples of the treatment for removing the inorganic particles include a method of removing the inorganic particles using a liquid in which the inorganic particles dissolve but the polyimide precursor or the polyimide do not dissolve (hereinafter, may be referred to as "particle removing liquid"). The particle removing liquid is selected depending on the inorganic particles to be used. For example, employable are an aqueous solution of an acid such as hydrofluoric acid, hydrochloric acid, hydrobromic acid, boric acid, perchloric acid, phosphoric acid, sulfuric acid, nitric acid, acetic acid, trifluoroacetic acid, and citric acid; and an aqueous solution of a base such as sodium hydroxide, potassium hydroxide, tetramethylammonium hydroxide, sodium carbonate, potassium carbonate, ammonia, and the organic amines described above. In addition, water may be used alone, depending on the inorganic particles and the polyimide precursor to be used.

In the second step, the heating method of heating the coat obtained in the first step to proceed with the imidization and obtain the polyimide film is not particularly limited. For example, a method of heating in two stages is mentioned. In a case of heating in two stages, for example, heating conditions described below are mentioned.

The heating condition in the first stage is preferably a temperature at which the particle shape is maintained. Specifically, for example, the temperature may be in a range of 50° C. or higher and 150° C. or lower, and is preferably in a range of 60° C. or higher and 140° C. or lower. Also, heating time may be in a range of 10 minutes or more and 60 minutes or less. The heating time may be shorter as the heating temperature is higher.

As the heating condition in the second stage, heating is performed, for example, under conditions at 150° C. or higher and 450° C. or lower (preferably 200° C. or higher and 430° C. or lower) for 20 minutes or longer and 120 minutes or shorter. When setting the heating conditions in the ranges, the imidization reaction further proceeds, and a polyimide film may be formed. During the heating reaction, heating may be performed by raising the temperature stepwise or slowly at a constant rate before reaching the final heating temperature.

The heating condition is not limited to the heating method in the two stages described above, and for example, a method of heating in one stage may be employed. In a case of the method of heating in one stage, for example, the imidization may be completed only by the heating conditions shown in the second stage.

In the second step, from the viewpoint of increasing porosity, it is preferable to perform a treatment of exposing the particles such that the particles are in a state being exposed. In the second step, the treatment of exposing the particles is favorably performed in the process of imidizing the polyimide precursor or after the imidization and before the treatment of removing the particles.

In this case, for example, in a case where a coat is formed on the substrate using the particle-dispersed polyimide precursor solution, the particle-dispersed polyimide precursor solution is applied on the substrate to form a coating film in which particles are embedded. Next, the coating film is dried to form a coat containing the polyimide precursor and particles. The coat formed by the method is in a state in which the particles are embedded. The coat may be subjected to the treatment of exposing the particles from the polyimide film, before performing heating and a treatment of removing particles, in a process of imidizing the polyimide precursor, or after imidization is completed (after imidization).

In the second step, the treatment of exposing the particles may be performed, for example, when the polyimide film is in the following state.

When the imidization ratio of the polyimide precursor in the polyimide film is less than 10% (that is, in a state in which the polyimide film may be dissolved in a solvent), in a case of exposing the particles, as the treatment of exposing the particles embedded in the polyimide film, a wiping treatment or an immersing treatment in a solvent is mentioned. The solvent to be used in this case may be the same as or different from the solvent used for the particle-dispersed polyimide precursor solution of the exemplary embodiment.

In addition, when the imidization ratio of the polyimide precursor in the polyimide film is 10% or more (that is, in a state in which it is difficult to dissolve in water or an organic solvent) and when the polyimide film is in a state in which the imidization is completed, a method of mechanically cutting with a tool such as sandpaper to expose the particles in a case of exposing the particles, or a method of exposing the resin particles by decomposing with a laser or the like in a case where the particles are resin particles is mentioned.

For example, in the case of mechanical cutting, some of the particles present in an upper region of the particles embedded in the polyimide film (that is, a region of the particles on a side away from the substrate) are cut together with the polyimide film present in the upper region of the particles and the cut particles are exposed from the surface of the polyimide film.

Thereafter, the particles are removed from the polyimide film in which the particles are exposed by the treatment of removing the particles described above. Then, a porous polyimide film from which the particles are removed is obtained (see FIG. 1).

Although the step of producing the porous polyimide film subjected to the treatment of exposing the particles in the second step is described above, the treatment of exposing the particles in the first step may be performed for increasing the porosity. In this case, in the first step, particles may be exposed by performing the treatment of exposing the particles in the process in which the coating film is obtained and then dried to form the coat. When performing the treatment of exposing the particles, the porosity of the porous polyimide film increases.

For example, in a process in which the coating film containing the polyimide precursor solution and the particles is obtained and then the coating film is dried to form the coat containing the polyimide precursor and the particles, as described above, the coat is in a state in which the polyimide precursor may dissolve in the solvent. When the coat is in the state, the particles may be exposed by, for example, a wiping treatment or an immersing treatment in a solvent. Specifically, when the polyimide precursor solution present in a region exceeding a thickness of the particle layer is subjected to a treatment of exposing the particle layer by wiping with a solvent, the polyimide precursor solution present in a region exceeding the thickness of the particle layer is removed. Then, the particles existing in the upper region of the particle layer (that is, the region of the particle layer on a side away from the substrate) are exposed from the surface of the coat.

In the second step, the substrate for forming the coat used in the first step may be released, when the dried coat is formed, when the polyimide precursor in the polyimide film becomes difficult to dissolve in an organic solvent, or when imidization is completed and the film is formed.

The porous polyimide film is obtained through the steps above. Then, the porous polyimide film may be post-processed.

Here, the imidization ratio of the polyimide precursor will be described.

Examples of the partially imidized polyimide precursor include a precursor having a structure having a repeating unit represented by formula (V-1), (V-2), or (V-3) described below.

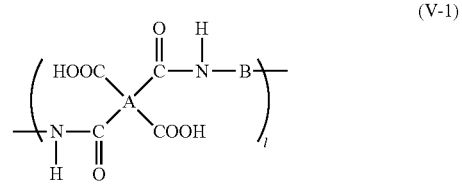

(V-1)

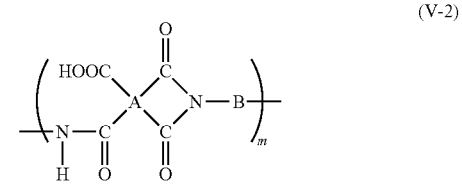

(V-2)

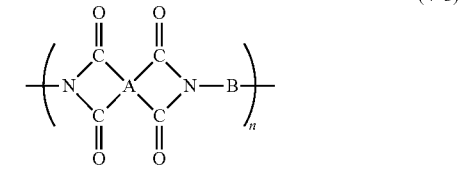

(V-3)

In formulas (V-1), (V-2), and (V-3), A and B have the same meanings as A and B in formula (I). l represents an integer of 1 or more, and m and n each independently represent 0 or an integer of 1 or more.

The imidization ratio of the polyimide precursor represents a ratio of the number of imide-closed bonds (2n+m) to the total number of bonds (2l+2m+2n) in a bonding portion (the reaction part between the tetracarboxylic dianhydride and the diamine compound) of the polyimide precursor. That is, the imidization ratio of the polyimide precursor is represented by "(2n+m)/(2l+2m+2n)".

The imidization ratio (value of "(2n+m)/(2l+2m+2n)") of the polyimide precursor is measured by a method described below.

—Measurement of Imidization Ratio of Polyimide Precursor—

Production of Polyimide Precursor Sample (i) A polyimide precursor composition to be measured is applied on a silicon wafer in a film thickness range of 1 μm or more and 10 μm or less to produce a coating film sample.

(ii) The coating film sample is immersed in tetrahydrofuran (THF) for 20 minutes to replace a solvent in the coating film sample with tetrahydrofuran (THF). The solvent for immersing is not limited to the THF and may be selected from solvents which do not dissolve the polyimide precursor and are miscible with a solvent component contained in a polyimide precursor composition. Specifically, alcohol solvents such as methanol and ethanol and ether compounds such as dioxane may be used.

(iii) The coating film sample is taken out from the THF, and $N_2$ gas is blown to the THF adhering to a surface of the coating film sample to remove the THF. The coating film sample is dried for 12 hours or longer at a temperature of 5° C. or higher and 25° C. or lower under a reduced pressure of 10 mmHg or less to produce a polyimide precursor sample.

Production of 100% Imidized Standard Sample (iv) Similar to the above (i), a polyimide precursor composition to be measured is applied onto a silicon wafer to produce a coating film sample.

(v) The coating film sample is heated at 380° C. for 60 minutes to perform an imidization reaction, thereby producing a 100% imidized standard sample.

Measurement and Analysis (vi) Infrared absorption spectra of the 100% imidized standard sample and a polyimide precursor sample are measured using a Fourier transform infrared spectrophotometer (FT-730 manufactured by Horiba Ltd.). A ratio I'(100) of the absorption peak (Ab' (1,780 cm$^{-1}$)) derived from an imide bond near 1780 cm$^{-1}$ to the absorption peak (Ab'(1,500 cm$^{-1}$)) derived from an aromatic ring near 1500 cm$^{-1}$ of the 100% imidized standard sample is obtained.

(vii) Similarly, the polyimide precursor sample is measured, and a ratio I(x) of the absorption peak (Ab (1,780 cm$^{-1}$)) derived from an imide bond near 1,780 cm$^{-1}$ to the absorption peak (Ab(1,500 cm$^{-1}$)) derived from an aromatic ring near 1500 cm$^{-1}$ is obtained.

Then, using the measured absorption peaks I'(100) and I(x), the imidization ratio of the polyimide precursor is calculated based on the following equation.

Imidization ratio of polyimide precursor=$I(x)/I'(100)$     Equation:

$I'(100)=(Ab'(1,780\ cm^{-1}))/(Ab'(1,500\ cm^{-1}))$     Equation:

$I(x)=(Ab(1,780\ cm^{-1}))/(Ab(1,500\ cm^{-1}))$     Equation:

The measurement of the imidization ratio of the polyimide precursor is applied to the measurement of the imidization ratio of the aromatic polyimide precursor. In a case of measuring the imidization ratio of the aliphatic polyimide precursor, a peak derived from the structure that does not change before and after the imidization reaction is used as the internal standard peak instead of the absorption peak of the aromatic ring.

(Application of Porous Polyimide Film)

Examples of an application to which the porous polyimide film according to the exemplary embodiment is applied include battery separators for lithium batteries or the like; separators for electrolytic condensers; electrolyte membranes for a fuel cell or the like; battery electrode materials; gas or liquid separation membranes; low dielectric constant materials; and filtration membranes.

EXAMPLES

Hereinafter, examples will be described, but the present invention is not limited to these examples. In the following description, "part(s)" and "%" are all based on weight unless otherwise specified.

Synthesis Example 1

(Synthesis of Resin Particles-1A)

670 parts by weight of styrene, 17.0 parts by weight of a surfactant DOWFAX 2A1 (47% solution, manufactured by Dow Chemical Co., Ltd.), and 670 parts by weight of ion-exchanged water are mixed, and the mixture is stirred and emulsified at 1,500 rpm for 30 minutes with a dissolver to produce a monomer emulsion. Subsequently, 1.10 parts by weight of DOWFAX 2A1 (47% solution, manufactured by Dow Chemical Co., Ltd.) and 1,500 parts by weight of ion-exchanged water are put into a reaction vessel. After heating the resultant contents to 75° C. under a nitrogen stream, 75 parts by weight of the monomer emulsion is added thereto. Thereafter, a polymerization initiator solution prepared by dissolving 15 parts by weight of ammonium persulfate in 98 parts by weight of ion-exchanged water is added dropwise over 10 minutes. After the dropwise addition, the mixture is reacted for 50 minutes, the remaining monomer emulsion is added dropwise over 220 minutes, and the mixture is further reacted for 50 minutes and then cooled to obtain a PSt particle dispersion-1. A solid content concentration is 22.8% by weight. The resin particles have an average particle diameter (D50v) of 0.42 μm and a GSDv of 1.17. Obtained resin particle dispersion having 100 parts by weight of resin particles (containing 338.6 parts by weight of water) in terms of a solid content, is lyophilized, and a powder resin particle-A containing 1.3% by weight of the surfactant DOWFAX 2A1 with respect to the resin particles is taken out.

Synthesis Example 2

(Synthesis of Resin Particles-1B)

20 parts by weight of deionized water is added to 100 parts by weight of the powder resin particles-1A and stirred and then centrifuged to sediment the particles, and a supernatant is removed. After repeating this operation 3 times, lyophilization is performed again, and a resin particle powder-1B from which the surfactant DOWFAX 2A1 is removed is taken out.

Synthesis Examples 3 to 10

(Synthesis of Resin Particles-2 to 8 and C1)

Resin particles-2 to 8, and C1 (for the comparative example) are produced in the same manner as in Synthesis example 1, except that a raw material to be used is changed from 670 parts by weight of styrene to a monomer shown in the tables of Examples (for example, as a raw material of the resin particles to be used in Example 6, styrene (80% by weight of the 670 parts by weight=536 parts by weight) and MMA (20% by weight of the 670 parts by weight=134 parts by weight).

Synthesis Example 11

Synthesis of polyimide precursor-1 152.25 parts by weight of N-methylpyrrolidone (NMP) and 13.74 parts by weight of p-phenylenediamine (PDA) (molecular weight 108.14) are added to a reaction vessel and dispersed by stirring at 50° C. for 10 minutes. Then, 37.01 parts by weight of 3,3',4,4'-biphenyltetracarboxylic dianhydride (BPDA) (molecular weight 294.22) are slowly added, and stirred for 7 hours to cause dissolution and reaction, while keeping the reaction temperature at 50° C., thereby obtaining a polyimide precursor solution having a solid content concentration of 25% by weight. Mw (converted to polystyrene) of GPC is 110,000.

This solution is dropped into 3 L of acetone being stirred to precipitate a polyimide precursor. The obtained solid is stirred again in 1 L of acetone, collected by filtration and dried in vacuum to obtain a polyimide precursor-1.

Synthesis Example 12

Synthesis of polyimide precursor-2 158.64 parts by weight of N-methylpyrrolidone (NMP) and 25.44 parts by weight of 4,4'-diaminodiphenyl ether (ODA) (molecular weight 200.24) are added to a reaction vessel and dispersed by stirring at 50° C. for 10 minutes. Then, 27.44 parts by weight of pyromellitic anhydride (PMDA) (molecular weight 218.12) are slowly added, and stirred for 7 hours to cause dissolution and reaction, while keeping the reaction temperature at 50° C., thereby obtaining a polyimide precursor solution having a solid content concentration of 25% by weight. The Mw (converted to polystyrene) obtained by GPC is 80,000.

This solution is dropped into 3 L of stirred acetone to precipitate a polyimide precursor. The obtained solid is stirred again in 1 L of acetone, collected by filtration and dried in vacuum to obtain a polyimide precursor-2.

Example 1

A mixed solvent in which a weight ratio between the dimethylsulfoxide (DMSO)/ethylene glycol (EG) is 50/50 is produced. Using the mixed solvent, a 30% by weight solution of the polyimide precursor-1 is produced. Separately, resin particles-1A are added to the mixed solvent to provide a concentration of 30% by weight, and the resultant is ultrasonically treated with an ultrasonic homogenizer (THU-80 power: Max, manufactured by AS ONE) for 30 seconds×4 times, while being cooled with ice water, and thus, a dispersion of the resin particles-1A is produced. The resin particles-1A contain 1.3% by weight of the dispersant Dowfax 2A1.

30 parts by weight of a solution of polyimide precursor-1 and 70 parts by weight of the dispersion of the resin particles-1A are mixed, and then mixed and stirred at 2,000 rpm for 3 minutes, and at 2,200 for 3 minutes, using a stirrer "AWATORI KENTARO" (manufactured by Shinky Co., Ltd.) to obtain a resin particle-dispersed polyimide precursor solution (1) of Example 1.

The obtained solution is diluted with a solvent having the same composition and a particle size distribution thereof is measured by the method described above. As with the original resin particle-1A, the average particle diameter (D50v) is 0.42 μm as a single peak and GSDv is 1.17, which is in a good dispersion state.

When the water content of the obtained solution is measured by the Karl Fischer method, the water content is 0.23% by weight with respect to the solution.

Examples 2 to 24 and Comparative Examples 1 to 8

Resin particle-dispersed polyimide precursor solutions (2) to (24) of Examples 2 to 24 and resin particle-dispersed polyimide precursor solutions (C1) to (C8) of Comparative examples 1 to 8 were obtained in the same manner as in Example 1, except that a kind and a ratio of the organic solvent to be used and a kind and a particle ratio of the resin particles, and a kind of dispersant to be added are changed as described in tables of Examples.

Example 25

42 parts by weight of the resin particles-1A are added to 181.99 parts by weight of a mixed solvent including dimethyl sulfoxide (DMSO)/propylene glycol (PG) at a weight ratio of 70/30, and further mixed and stirred at 2,000 rpm for 3 minutes, and at 2,200 for 3 minutes, using a stirrer "AWATORI KENTARO" (manufactured by Shinky Co., Ltd.) to disperse the resin particles. The dispersion is put into a reaction vessel, 4.87 parts by weight of p-phenylenediamine (molecular weight 108.14) is added thereto, and the resultant is stirred at 40° C. for 10 minutes to be dispersed. Then, 13.13 parts by weight of 3,3',4,4'-biphenyltetracarboxylic dianhydride (molecular weight 294.22) are slowly added thereto, and the resultant is stirred for 15 hours to cause dissolution and reaction, while keeping the reaction temperature at 40° C., to obtain a resin particle polyimide precursor solution (25) (solid concentration 30% by weight) of Example 25. The Mw (converted to polystyrene) obtained by GPC is 80,000.

<Evaluation>

(Observation of Liquid after Aging)

The resin particle-dispersed polyimide precursor solution is stored for 2 days by standing in a constant temperature bath at 40° C., and then stored for 2 days by standing in a refrigerator at 5° C. for 2 days. This storage cycle is defined as one cycle, and after the storage cycle is repeated 5 times, the presence or absence of precipitation is confirmed. When the storage cycle is repeated, the polyimide precursor may be precipitated.

Further, the particle size distribution of the resin particles is measured by the same method as described above and compared to the initial particle size distribution (described in the tables of Examples). When the swelling or dissolution of the resin particles proceeds, it may be seen that: fusion between the particles occurs; the volume average particle diameter D50v increases; the volume particle size distribution index (GSDv) increases; and a peak appears on a large particle diameter side apart from the original particle size distribution peak.

—Evaluation Criteria—

A+: No precipitation and no change in particle size distribution

A: No precipitation, GSDv increases within 5%

B: Slight precipitation occurs, and a new particle size distribution peak appears on a large particle diameter side at less than 5% (volume conversion) of the original peak.

C: Precipitation occurs. Furthermore, a new particle size distribution peak appears on the large particle diameter side at 5% or more (volume conversion) of the original peak.

(Viscosity Change Rate of Liquid after Aging)

The viscosity of the solution is measured under the conditions described below before and after the storage cycle above.

Measuring device: E-type rotational viscometer TV-20H (Toki Sangyo Co., Ltd.)
Measurement probe: No. 3 type rotor 3°×R14
Measurement temperature: 35° C. The viscosity change rate (%) after aging is calculated from formula described below. The smaller the numerical value, the better the storage stability. (|| indicates an absolute value)

|(Viscosity after aging)−(Initial viscosity)|/(Initial viscosity)×100(%)

(Observation of Defect in Porous Polyimide Film)

Using the resin particle-dispersed polyimide precursor solution before and after the storage cycle above, the porous polyimide film is produced by a procedure described in (i) a method of removing particles by thermal decomposition or (ii) a method of removing particles by dissolution.

(i) Method of Removing Particles by Thermal Decomposition

A resin particle-containing polyimide precursor solution before and after the storage cycle is applied to a glass substrate having a size of 76 mm×52 mm using an applicator so that a film thickness after baking is 25 m, and the film is air-dried at 70° C. for 1 hour. Then, the temperature is raised from 70° C. to 400° C. at a heating rate of 5° C./min, and the film is kept at 400° C. for 1 hour. Thereafter, the film is left to cool to room temperature and immersed in water to obtain a porous polyimide film.

(ii) Method of Removing Particles by Dissolution

The resin particle-containing polyimide precursor solution before and after the storage cycle is applied to a glass substrate having a size of 76 mm×52 mm using an applicator such that the film thickness after baking is 25 m, and the film is air-dried at 70° C. for 1 hour. Thereafter, the film is immersed in THE for 2 hours. After air-drying the film, the temperature is raised from 70° C. to 400° C. at a heating rate of 5° C./min, and the film is kept at 400° C. for 1 hour. Thereafter, the film is left to cool to room temperature and immersed in water to obtain a porous polyimide film.

The produced porous polyimide film is observed visually and with an optical microscope. When the polyimide precursor is precipitated or the swelling or dissolution of the resin particles progresses to cause the particles to fuse together, with aging of the liquid, phase separation of the film or pinholes occur.

—Evaluation Criteria—

A+: Neither phase separation nor pinhole occurs
A: No phase separation is observed, and 1 or 2 pinholes are observed at an edge of the film when observed with an optical microscope
B: Mottled pattern is generated on a part of the film, and a visible pinhole is generated on a part of the film
C: Mottled pattern is generated on the entire film, and visually visible pinholes are generated on the entire film The terms described in Tables 4 to 8 will be described below.

"Kind" of the polyimide precursor indicates a kind of the polyimide precursor contained in the polyimide precursor solution.

"Polyimide precursor-1": Condensate of BPDA and PDA obtained in Synthesis Example 10

"Polyimide precursor-2": Condensate of PMDA and ODA obtained in Synthesis Example 11

"HSP (PI)" of the polyimide precursor indicates the HSP of the polyimide precursor.

"Kind" of the resin particle indicates a kind of the resin particles contained in the polyimide precursor solution.

"Resin particles-1A": Polystyrene particles obtained in Synthesis Example 1 (containing 1.3% by weight of the dispersant DOWFAX 2A1 with respect to the resin particles)

"Resin particles-1B": Polystyrene particles obtained in Synthesis Example 2 (containing no dispersant)

"Resin particle-2": Styrene/MMA copolymer particles obtained in Synthesis Example 3 (weight ratio 80/20)

"Resin Particle-3": Styrene/MMA copolymer particles obtained in Synthesis Example 4 (weight ratio 70/30)

"Resin particle-4": Styrene/MMA copolymer particles obtained in Synthesis Example 5 (weight ratio 60/40)

"Resin Particle-5": Styrene/MMA copolymer particles obtained in Synthesis Example 6 (weight ratio 55/45)

"Resin particles-6": Styrene/EMA copolymer particles obtained in Synthesis Example 7 (weight ratio 80/20)

"Resin particles-7": Styrene/BA copolymer particles obtained in Synthesis Example 8 (weight ratio 85/15)

"Resin particles-8": Styrene/MMA/BA copolymer particles obtained in Synthesis Example 9 (weight ratio 80/10/10)

"Resin particles-C1": Styrene/BA copolymer particles obtained in Synthesis Example 10 (weight ratio 50/50)

"Monomer 1" to "monomer 3" of the resin particles indicate the kind and % by weight of the monomer used in the synthesis of the resin particles. The numbers in parentheses indicate "% by weight" with respect to 670 parts by weight of the monomer used.

St: Styrene
MMA: Methyl methacrylate
EMA: Ethyl methacrylate
BA: n-Butyl acrylate "HSP (P)" of the resin particles indicates the HSP of the resin particles.

The "particle ratio (wt %)" of the resin particles indicates the "% by weight" of the resin particles with respect to the weight of the solid content of the polyimide precursor solution.

Abbreviations of solvents are described below.

"DMSO": Dimethyl sulfoxide
"DMAc": N,N-dimethylacetamide
"GBL": γ-butyrolactone
"CL": ε-caprolactone
"FA": Furfuryl alcohol
"EG": Ethylene glycol
"EtOH": ethanol
"PG": Propylene glycol
"EG-Me": Ethylene glycol monomethyl ether
"DEG": Diethylene glycol
"DPG": Dipropylene glycol
"EC": Ethylene carbonate The "ratio (wt %) of the solvent to the resin particles of (S2)" indicates the "% by weight" of the second organic solvent with respect to the resin particles contained in the polyimide precursor solution.

Abbreviations of surfactants are described below.

"D2A1": DOWFAX 2A1
"C12EO": Polyoxyethylene lauryl ether

TABLE 4

|  |  |  | Example 1 | Example 2 | Example 3 | Example 4 | Example 5 | Example 6 | Example 7 |
|---|---|---|---|---|---|---|---|---|---|
| Resin particle-dispersed polyimide precursor solution | Polyimide precursor | Kind | 1 | 1 | 1 | 1 | 1 | 1 | 1 |
|  |  | HSP(PI) (δD/δP/δH) | 22.6/13.5/14.4 | 22.6/13.5/14.4 | 22.6/13.5/14.4 | 22.6/13.5/14.4 | 22.6/13.5/14.4 | 22.6/13.5/14.4 | 22.6/13.5/14.4 |
|  | Resin particle | Kind | 1A | 1A | 1A | 1A | 1A | 2 | 3 |
|  |  | Monomer 1 | St(100) | St(100) | St(100) | St(100) | St(100) | St(80) | St(70) |
|  |  | Monomer 2 | — | — | — | — | — | MMA(20) | MMA(30) |
|  |  | Monomer 3 | — | — | — | — | — | — | — |
|  |  | HSP(P) (δD/δP/δH) | 18.5/4.5/2.9 | 18.5/4.5/2.9 | 18.5/4.5/2.9 | 18.5/4.5/2.9 | 18.5/4.5/2.9 | 18.5/5.7/3.3 | 18.5/6.3/3.6 |
|  |  | D50v(μm) | 0.42 | 0.42 | 0.42 | 0.42 | 0.42 | 0.42 | 0.41 |
|  |  | GSDv | 1.15 | 1.15 | 1.15 | 1.15 | 1.15 | 1.17 | 1.16 |
|  |  | Particle ratio (wt %) | 70 | 70 | 70 | 70 | 70 | 70 | 70 |
|  | Solvent | Kind (S1) | DMSO | DMSO | DMSO | DMSO | DMSO | DMSO | DMSO |
|  |  | HSP distance between (S1) and resin particle | 14.0 | 14.0 | 14.0 | 14.0 | 14.0 | 12.7 | 12.1 |
|  |  | HSP distance between (S1) and polyimide precursor | 9.8 | 9.8 | 9.8 | 9.8 | 9.8 | 9.8 | 9.8 |
|  |  | Kind (S2) | EG | EG | EG | EG | EG | PG | PG |
|  |  | HSP distance between (S2) and resin particle | 24.2 | 24.2 | 24.2 | 24.2 | 24.2 | 18.9 | 18.5 |
|  |  | Absolute value of difference in boiling point ((S1)-(S2)) | 8 | 8 | 8 | 8 | 8 | 7 | 7 |
|  |  | Weight ratio (S1)/(S2) | 50/50 | 60/40 | 70/30 | 80/20 | 85/15 | 70/30 | 70/30 |
|  |  | HSP distance between mixed solvent and polyimide precursor | 10.5 | 9.8 | 9.3 | 9.2 | 9.2 | 9.5 | 9.5 |
|  |  | Ratio (wt %) of (S2) to resin particle | 166.7 | 133.3 | 100.0 | 66.7 | 50.0 | 100.0 | 100.0 |
|  | Surfactant | Kind (1.3 wt % with respect to resin particle) | DF2A1 | DF2A1 | DF2A1 | DF2A1 | DF2A1 | DF2A1 | DF2A1 |
|  | Water | Water content (wt %) in solution | 0.23 | 0.25 | 0.26 | 0.25 | 0.22 | 0.27 | 0.25 |
|  |  | Solid content (wt %) | 30 | 30 | 30 | 30 | 30 | 30 | 30 |
| Evaluation (Solution) | Observation of liquid after aging |  | A | A+ | A+ | A+ | A | A+ | A+ |
|  | Viscosity change rate of liquid after aging |  | 127 | 112 | 115 | 113 | 126 | 110 | 114 |
| Evaluation (Film) | Method of removing particle |  | Thermal decomposition | Thermal decomposition | Thermal decomposition | Thermal decomposition | Thermal decomposition | Thermal decomposition | Thermal decomposition |
|  | Film defect (before storage cycle) |  | A+ | A+ | A+ | A+ | A+ | A+ | A+ |
|  | Film defect (after storage cycle) |  | A | A+ | A+ | A+ | A | A+ | A+ |

TABLE 5

|  |  |  | Example 8 | Example 9 | Example 10 | Example 11 | Example 12 | Example 13 | Example 14 |
|---|---|---|---|---|---|---|---|---|---|
| Resin particle-dispersed polyimide precursor solution | Polyimide precursor | Kind | 1 | 1 | 1 | 1 | 1 | 2 | 1 |
|  |  | HSP(PI) (δD/δP/δH) | 22.6/13.5/14.4 | 22.6/13.5/14.4 | 22.6/13.5/14.4 | 22.6/13.5/14.4 | 22.6/13.5/14.4 | 22.7/13.6/15.0 | 22.6/13.5/14.4 |
|  | Resin particle | Kind | 4 | 5 | 6 | 7 | 8 | 1A | 1A |
|  |  | Monomer 1 | St(60) | St(55) | St(80) | St(85) | St(80) | St(100) | St(100) |
|  |  | Monomer 2 | MMA(40) | MMA(45) | EMA(20) | BA(15) | MMA(10) | — | — |
|  |  | Monomer 3 | — | — | — | — | BA(10) | — | — |
|  |  | HSP(P) (δD/δP/δH) | 18.5/6.9/3.8 | 18.5/7.2/3.9 | 18.3/5.5/3.1 | 18.2/5.2/2.9 | 18.3/5.6/3.1 | 18.5/4.5/2.9 | 18.5/4.5/2.9 |
|  |  | D50v(μm) | 0.44 | 0.42 | 0.45 | 0.44 | 0.45 | 0.42 | 0.42 |
|  |  | GSDv | 1.15 | 1.17 | 1.16 | 1.16 | 1.18 | 1.15 | 1.15 |
|  |  | Particle ratio (wt %) | 70 | 70 | 70 | 70 | 70 | 70 | 70 |
|  | Solvent | Kind (S1) | DMSO | DMSO | DMSO | DMSO | DMSO | DMSO | DMSO |
|  |  | HSP distance between (S1) and resin particle | 11.5 | 11.2 | 13.0 | 13.4 | 13.0 | 14.0 | 14.0 |
|  |  | HSP distance between (S1) and polyimide precursor | 9.8 | 9.8 | 9.8 | 9.8 | 9.8 | 9.8 | 9.8 |
|  |  | Kind (S2) | PG | PG | PG | PG | PG | PG | PG |
|  |  | HSP distance between (S2) and resin particle | 18.2 | 18.0 | 19.1 | 19.3 | 19.0 | 19.6 | 19.6 |
|  |  | Absolute value of difference in boiling point ((S1)-(S2)) | 7 | 7 | 7 | 7 | 7 | 7 | 7 |
|  |  | Weight ratio (S1)/(S2) | 70/30 | 70/30 | 70/30 | 70/30 | 70/30 | 70/30 | 70/30 |
|  |  | HSP distance between mixed solvent and polyimide precursor | 9.5 | 9.5 | 9.5 | 9.5 | 9.5 | 9.7 | 9.5 |
|  |  | Ratio (wt %) of (S2) to resin particle | 100.0 | 100.0 | 100.0 | 100.0 | 100.0 | 100.0 | 100.0 |
|  | Surfactant | Kind (1.3 wt % with respect to resin particle) | DF2A1 | DF2A1 | DF2A1 | DF2A1 | DF2A1 | DF2A1 | DF2A1 |
|  | Water | Water content (wt %) in solution | 0.27 | 0.26 | 0.27 | 0.32 | 0.27 | 0.22 | 0.28 |
|  |  | Solid content (wt %) | 30 | 30 | 30 | 30 | 30 | 30 | 30 |
| Evaluation (Solution) |  | Observation of liquid after aging | A | A | A+ | A+ | A+ | A+ | A+ |
|  |  | Viscosity change rate of liquid after aging | 125 | 126 | 114 | 116 | 115 | 113 | 110 |
| Evaluation (Film) |  | Method of removing particle | Thermal decomposition | Thermal decomposition | Thermal decomposition | Thermal decomposition | Thermal decomposition | Thermal decomposition | Thermal decomposition |
|  |  | Film defect (before storage cycle) | A+ | A+ | A+ | A+ | A+ | A+ | A+ |
|  |  | Film defect (after storage cycle) | A | A | A+ | A+ | A+ | A+ | A+ |

TABLE 6

|  |  |  | Example 15 | Example 16 | Example 17 | Example 18 | Example 19 | Example 20 | Example 21 |
|---|---|---|---|---|---|---|---|---|---|
| Resin particle-dispersed polyimide precursor solution | Polyimide precursor | Kind | 1 | 1 | 1 | 1 | 1 | 1 | 1 |
|  |  | HSP(PI) (δD/δP/δH) | 22.6/13.5/14.4 | 22.6/13.5/14.4 | 22.6/13.5/14.4 | 22.6/13.5/14.4 | 22.6/13.5/14.4 | 22.6/13.5/14.4 | 22.6/13.5/14.4 |
|  | Resin particle | Kind | 1A | 1A | 1A | 1A | 1A | 1A | 1B |
|  |  | Monomer 1 | St(100) | St(100) | St(100) | St(100) | St(100) | St(100) | St(100) |
|  |  | Monomer 2 | — | — | — | — | — | — | — |
|  |  | Monomer 3 | — | — | — | — | — | — | — |
|  |  | HSP(P) (δD/δP/δH) | 18.5/4.5/2.9 | 18.5/4.5/2.9 | 18.5/4.5/2.9 | 18.5/4.5/2.9 | 18.5/4.5/2.9 | 18.5/4.5/2.9 | 18.5/4.5/2.9 |
|  |  | D50v(μm) | 0.42 | 0.42 | 0.42 | 0.42 | 0.42 | 0.42 | 0.42 |
|  |  | GSDv | 1.15 | 1.15 | 1.15 | 1.15 | 1.15 | 1.15 | 1.15 |
|  |  | Particle ratio (wt %) | 70 | 70 | 70 | 70 | 70 | 70 | 70 |

TABLE 6-continued

|  |  |  | Example 15 | Example 16 | Example 17 | Example 18 | Example 19 | Example 20 | Example 21 |
|---|---|---|---|---|---|---|---|---|---|
|  | Solvent | Kind (S1) | BL | CL | FA | DMSO | DMSO | DMSO | DMSO |
|  |  | HSP distance between (S1) and resin particle | 12.9 | 11.7 | 12.8 | 14.0 | 14.0 | 14.0 | 14.0 |
|  |  | HSP distance between (S1) and polyimide precursor | 12.0 | 9.2 | 12.0 | 9.8 | 9.8 | 9.8 | 9.8 |
|  |  | Kind (S2) | PG | PG | DEG | DPG | EC | DEG | PG |
|  |  | HSP distance between (S2) and resin particle | 19.6 | 19.6 | 18.2 | 16.5 | 17.4 | 18.2 | 19.6 |
|  |  | Absolute value of difference in boiling point ((S1)-(S2)) | 22 | 71 | 75 | 43 | 72 | 56 | 7 |
|  |  | Weight ratio (S1)/(S2) | 70/30 | 70/30 | 80/20 | 70/30 | 70/30 | 70/30 | 70/30 |
|  |  | HSP distance between mixed solvent and polyimide precursor | 10.4 | 8.1 | 11.9 | 9.8 | 11.3 | 9.7 | 9.5 |
|  |  | Ratio (wt %) of (S2) to resin particle | 100.0 | 100.0 | 66.7 | 100.0 | 100.0 | 100.0 | 100.0 |
|  | Surfactant | Kind (1.3 wt % with respect to resin particle) | DF2A1 | DF2A1 | DF2A1 | DF2A1 | DF2A1 | DF2A1 | C12E0 |
|  | Water | Water content (wt %) in solution | 0.23 | 0.23 | 0.27 | 0.24 | 0.36 | 0.29 | 0.22 |
|  |  | Solid content (wt %) | 30 | 30 | 30 | 30 | 30 | 30 | 30 |
| Evaluation (Solution) |  | Observation of liquid after aging | A | A | A | A | A | A | A |
|  |  | Viscosity change rate of liquid after aging | 125 | 122 | 123 | 124 | 121 | 125 | 127 |
| Evaluation (Film) |  | Method of removing particle | Thermal decomposition | Thermal decomposition | Thermal decomposition | Thermal decomposition | Thermal decomposition | Thermal decomposition | Thermal decomposition |
|  |  | Film defect (before storage cycle) | A+ | A+ | A+ | A+ | A+ | A+ | A+ |
|  |  | Film defect (after storage cycle) | A | A | A | A | A | A | A |

TABLE 7

|  |  |  | Example 22 | Example 23 | Example 24 | Example 25 | Comparative Example 1 | Comparative Example 2 | Comparative Example 3 |
|---|---|---|---|---|---|---|---|---|---|
| Resin particle-dispersed polyimide precursor solution | Polyimide precursor | Kind | 1 | 1 | 1 | 1 | 1 | 1 | 1 |
|  |  | HSP(PI) ($\delta D/\delta P/\delta H$) | 22.6/13.5/14.4 | 22.6/13.5/14.4 | 22.6/13.5/14.4 | 22.6/13.5/14.4 | 22.6/13.5/14.4 | 22.6/13.5/14.4 | 22.6/13.5/14.4 |
|  | Resin particle | Kind | 1A | 1A | 1A | 1A | 1B | 1B | 1A |
|  |  | Monomer 1 | St(100) | St(100) | St(100) | St(100) | St(100) | St(100) | St(100) |
|  |  | Monomer 2 | — | — | — | — | — | — | — |
|  |  | Monomer 3 | — | — | — | — | — | — | — |
|  |  | HSP(P) ($\delta D/\delta P/\delta H$) | 18.5/4.5/2.9 | 18.5/4.5/2.9 | 18.5/4.5/2.9 | 18.5/4.5/2.9 | 18.5/4.5/2.9 | 18.5/4.5/2.9 | 18.5/4.5/2.9 |
|  |  | D50v(μm) | 0.42 | 0.42 | 0.42 | 0.42 | 0.42 | 0.42 | 0.42 |
|  |  | GSDv | 1.15 | 1.15 | 1.15 | 1.15 | 1.15 | 1.15 | 1.15 |
|  |  | Particle ratio (wt %) | 70 | 70 | 70 | 70 | 70 | 70 | 70 |
|  | Solvent | Kind (S1) | DMSO | DMSO | DMSO | DMSO | DMAc | DMSO | DMAc |
|  |  | HSP distance between (S1) and resin particle | 14.0 | 14.0 | 14.0 | 14.0 | 10.7 | 14.0 | 10.7 |
|  |  | HSP distance between (S1) and polyimide precursor | 9.8 | 9.8 | 9.8 | 9.8 | 12.5 | 9.8 | 12.5 |

TABLE 7-continued

|  |  | Example 22 | Example 23 | Example 24 | Example 25 | Comparative Example 1 | Comparative Example 2 | Comparative Example 3 |
|---|---|---|---|---|---|---|---|---|
|  | Kind (S2) | PG | PG | PG | PG | EG | GBL | EtOH |
|  | HSP distance between (S2) and resin particle | 19.6 | 19.6 | 19.6 | 19.6 | 24.2 | 12.9 | 17.9 |
|  | Absolute value of difference in boiling point ((S1)-(S2)) | 7 | 7 | 7 | 7 | 32 | 15 | 87 |
|  | Weight ratio (S1)/(S2) | 70/30 | 70/30 | 70/30 | 70/30 | 60/40 | 60/40 | 50/50 |
|  | HSP distance between mixed solvent and polyimide precursor | 9.5 | 9.5 | 9.5 | 9.5 | 11.8 | 10.6 | 13.0 |
|  | Ratio (wt %) of (S2) to resin particle | 100.0 | 100.0 | 100.0 | 100.0 | 133.3 | 133.3 | 166.7 |
| Surfactant | Kind (1.3 wt % with respect to resin particle) | DF2A1 | DF2A1 | DF2A1 | DF2A1 | C12E0 | C12E0 | — |
| Water | Water content (wt %) in solution | 0.12 | 2.9 | 0.28 | 0.33 | 0.21 | 0.24 | 0.37 |
|  | Solid content (wt %) | 30 | 30 | 30 | 30 | 30 | 30 | 30 |
| Evaluation (Solution) | Observation of liquid after aging | A | A | A+ | A+ | C | C | C |
|  | Viscosity change rate of liquid after aging | 124 | 122 | 113 | 114 | 156 | 204 | 184 |
| Evaluation (Film) | Method of removing particle | Thermal decomposition | Thermal decomposition | Dissolution | Thermal decomposition | Thermal decomposition | Thermal decomposition | Thermal decomposition |
|  | Film defect (before storage cycle) | A+ | A+ | A+ | A+ | A | A | A |
|  | Film defect (after storage cycle) | A | A | A+ | A+ | C | C | C |

TABLE 8

|  |  |  | Comparative Example 4 | Comparative Example 5 | Comparative Example 6 | Comparative Example 7 | Comparative Example 8 |
|---|---|---|---|---|---|---|---|
| Resin particle-dispersed polyimide precursor solution | Polyimide precursor | Kind | 1 | 2 | 2 | 2 | 2 |
|  |  | HSP(PI) ($\delta D/\delta P/\delta H$) | 22.6/13.5/14.4 | 22.7/13.6/15.0 | 22.7/13.6/15.0 | 22.7/13.6/15.0 | 22.7/13.6/15.0 |
|  | Resin particle | Kind | C1 | 1A | 1A | 1A | 1A |
|  |  | Monomer 1 | St(50) | St(100) | St(100) | St(100) | St(100) |
|  |  | Monomer 2 | MMA(50) | — | — | — | — |
|  |  | Monomer 3 | — | — | — | — | — |
|  |  | HSP(P) ($\delta D/\delta P/\delta H$) | 18.6/7.5/4.0 | 18.5/4.5/2.9 | 18.5/4.5/2.9 | 18.5/4.5/2.9 | 18.5/4.5/2.9 |
|  |  | D50v(μm) | 0.43 | 0.42 | 0.42 | 0.42 | 0.42 |
|  |  | GSDv | 1.14 | 1.15 | 1.15 | 1.15 | 1.15 |
|  |  | Particle ratio (wt %) | 70 | 70 | 70 | 70 | 70 |
|  | Solvent | Kind (S1) | DMSO | DMSO | DMSO | DMSO | DMSO |
|  |  | HSP distance between (S1) and resin particle | 10.8 | 14.0 | 14.0 | 14.0 | 14.0 |
|  |  | HSP distance between (S1) and polyimide precursor | 9.8 | 9.8 | 9.8 | 9.8 | 9.8 |
|  |  | Kind (S2) | PG | EG-Me | Methyl lactate | PG | — |
|  |  | HSP distance between (S2) and resin particle | 17.9 | 13.6 | 14.1 | 19.6 | — |
|  |  | Absolute value of difference in boiling point ((S1)-(S2)) | 7 | 65 | 45 | 7 | — |

TABLE 8-continued

|  |  | Comparative Example 4 | Comparative Example 5 | Comparative Example 6 | Comparative Example 7 | Comparative Example 8 |
|---|---|---|---|---|---|---|
|  | Weight ratio (S1)/(S2) | 70/30 | 70/30 | 70/30 | 40/60 | 100/0 |
|  | HSP distance between mixed solvent and polyimide precursor | 9.5 | 10.6 | 10.0 | 10.7 | 10.2 |
|  | Ratio (wt %) of (S2) to resin particle | 100.0 | 100.0 | 100.0 | 100.0 | 100.0 |
| Surfactant | Kind (1.3 wt % with respect to resin particle) | DF2A1 | DF2A1 | DF2A1 | DF2A1 | DF2A1 |
| Water | Water content (wt %) in solution | 0.33 | 0.25 | 0.26 | 0.27 | 0.26 |
|  | Solid content (wt %) | 30 | 30 | 30 | 30 | 30 |
| Evaluation (Solution) | Observation of liquid after aging | C | C | C | C | C |
|  | Viscosity change rate of liquid after aging | 145 | 155 | 147 | 187 | 193 |
| Evaluation (Film) | Method of removing particle | Thermal decomposition | Thermal decomposition | Thermal decomposition | Thermal decomposition | Thermal decomposition |
|  | Film defect (before storage cycle) | A | A | A | A | A |
|  | Film defect (after storage cycle) | C | C | C | C | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor solution comprising:
    a polyimide precursor;
    a resin particle having 55% by weight or more of a structural unit derived from a styrene derivative; and
    a mixed solvent containing a first organic solvent (S1) and a second organic solvent (S2),
    wherein:
    a content of the polyimide precursor in the polyimide precursor solution is 0.1% by weight or more and 40% by weight or less,
    a volume ratio of the resin particle with respect to a total solid content of the polyimide precursor and the resin particle in the polyimide precursor solution is 20% or more and 80% or less, and
    the polyimide precursor solution satisfies the following conditions (1) to (4),
    condition (1): a weight ratio (S1/S2) of the first organic solvent (S1) to the second organic solvent (S2) is from 50/50 to 90/10,
    condition (2): a Hansen solubility parameter (HSP) distance between the first organic solvent (S1) and the resin particle is 11 or more and less than 16,
    condition (3): a HSP distance between the second organic solvent (S2) and the resin particle is 16 or more, and
    condition (4): a HSP distance between the mixed solvent and the polyimide precursor is 12 or less.

2. The polyimide precursor solution according to claim 1, wherein the polyimide precursor solution further satisfies the following conditions (12) to (14),
    condition (12): a HSP distance between the first organic solvent (S1) and the resin particle is 11 or more and less than 16 and a HSP distance between the first organic solvent (S1) and the polyimide precursor is 11 or less,
    condition (13): a HSP distance between the second organic solvent (S2) and the resin particle is 17 or more, and
    condition (14): a HSP distance between the mixed solvent and the polyimide precursor is 11 or less.

3. The polyimide precursor solution according to claim 1, wherein a boiling point of each of the first organic solvent (S1) and the second organic solvent (S2) is 150° C. or higher.

4. The polyimide precursor solution according to claim 1, wherein a boiling point difference (absolute value) between the first organic solvent (S1) and the second organic solvent (S2) is 30° C. or lower.

5. The polyimide precursor solution according to claim 1, wherein a boiling point difference (absolute value) between the first organic solvent (S1) and the second organic solvent (S2) is 20° C. or lower.

6. The polyimide precursor solution according to claim 1, wherein the first organic solvent (S1) is at least one selected from the group consisting of dimethyl sulfoxide, γ-butyrolactone, ε-caprolactone, and furfuryl alcohol.

7. The polyimide precursor solution according to claim 1, wherein the first organic solvent (S1) is dimethyl sulfoxide.

8. The polyimide precursor solution according to claim 1, wherein the second organic solvent (S2) is at least one selected from the group consisting of ethylene glycol, diethylene glycol, propylene glycol, and dipropylene glycol.

9. The polyimide precursor solution according to claim 8, wherein the second organic solvent (S2) is at least one selected from the group consisting of ethylene glycol and propylene glycol.

10. The polyimide precursor solution according to claim 1, wherein a content of the second organic solvent (S2) with respect to the resin particle is 60% by weight or more.

11. The polyimide precursor solution according to claim 1, wherein the resin particle has 70% by weight or more of the structural unit derived from the styrene derivative.

12. The polyimide precursor solution according to claim 1, further comprising:
    an anionic surfactant in an amount of 0.01% by weight or more and 3% by weight or less with respect to the resin particle.

13. The polyimide precursor solution according to claim 1, further comprising:
    0.2% by weight or more and 2% by weight or less of water with respect to the entire polyimide precursor solution.

14. A method for producing a porous polyimide film comprising:
    forming a coating film by applying the polyimide precursor solution according to claim 1 on a substrate,
    forming a dried film containing the polyimide precursor and the resin particle by drying the coating film, and
    forming a polyimide film by heating the dried film to thereby imidize the polyimide precursor, wherein in forming the polyimide film, a treatment of removing the resin particle is included.

15. The polyimide precursor solution according to claim 1, wherein the content of the polyimide precursor in the polyimide precursor solution is 0.5% by weight or more and 25% by weight or less.

16. The polyimide precursor solution according to claim 1, wherein the content of the polyimide precursor in the polyimide precursor solution is 1% by weight or more and 20% by weight or less.

17. The polyimide precursor solution according to claim 1, wherein the volume ratio of the resin particle with respect to the total solid content of the polyimide precursor and the resin particle in the polyimide precursor solution is 30% or more and 75% or less.

18. The polyimide precursor solution according to claim 1, wherein a proportion of the resin particle in the polyimide precursor solution is greater than a proportion of the polyimide precursor in the polyimide precursor solution by volume.

19. The polyimide precursor solution according to claim 1, wherein:
    the content of the polyimide precursor in the polyimide precursor solution is 1% by weight or more and 40% by weight or less, and
    a proportion of the resin particle in the polyimide precursor solution is greater than a proportion of the polyimide precursor in the polyimide precursor solution by volume.

\* \* \* \* \*